United States Patent
Quirk et al.

(10) Patent No.: US 10,223,349 B2
(45) Date of Patent: Mar. 5, 2019

(54) INDUCING AND APPLYING A SUBJECT-TARGETED CONTEXT FREE GRAMMAR

(71) Applicant: Microsoft Technology Licensing, LLC, Redmond, WA (US)

(72) Inventors: Christopher B. Quirk, Seattle, WA (US); Pallavi Choudhury, Redmond, WA (US); Jurij Ganitkevic, Baltimore, MD (US); Luke S. Zettlemoyer, Seattle, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 327 days.

(21) Appl. No.: 13/771,100

(22) Filed: Feb. 20, 2013

(65) Prior Publication Data

US 2014/0236571 A1 Aug. 21, 2014

(51) Int. Cl.
*G06F 17/30* (2006.01)
*G06F 17/27* (2006.01)

(52) U.S. Cl.
CPC .................. *G06F 17/271* (2013.01)

(58) Field of Classification Search
CPC ..................................... G06F 17/28
USPC .......................................... 704/9
See application file for complete search history.

(56) References Cited

U.S. PATENT DOCUMENTS

| | | | |
|---|---|---|---|
| 5,275,569 A * | 1/1994 | Watkins | G09B 19/06 434/156 |
| 5,429,513 A | 7/1995 | Diaz-Plaza | |
| 5,630,121 A * | 5/1997 | Braden-Harder | G06F 17/30265 |
| 6,302,697 B1 | 10/2001 | Tallal et al. | |
| 6,983,239 B1 * | 1/2006 | Epstein | G06F 17/271 704/257 |
| 7,512,537 B2 | 3/2009 | Pahud et al. | |
| 7,584,092 B2 | 9/2009 | Brockett et al. | |
| 7,901,211 B2 | 3/2011 | Pennebaker | |
| 7,937,265 B1 | 5/2011 | Pasca et al. | |
| 8,704,948 B2 | 4/2014 | Mountain | |
| 9,116,880 B2 | 8/2015 | Dolan et al. | |
| 2006/0015320 A1 | 1/2006 | Och | |

(Continued)

FOREIGN PATENT DOCUMENTS

CN 101105791 A 1/2008

OTHER PUBLICATIONS

Bretaudière, et al., "Associating Automatic Natural Language Processing to Serious Games and Virtual Worlds," retrieved at <<http://hal.inria.fr/docs/00/65/59/80/PDF/Natural_Language_Processing.pdf>>, Journal of Virtual Worlds Research, vol. 4, No. 3, Dec. 2011, 14 pages.

(Continued)

*Primary Examiner* — Shreyans A Patel

(57) ABSTRACT

A processing system is described which induces a context free grammar (CFG) based on a set of descriptions. The descriptions pertain to a particular subject. Thus, the CFG targets the particular subject, and is accordingly referred to as a subject-targeted context free grammar (ST-CFG). The processing system can use the ST-CFG to determine whether a new description is a proper description of the subject. The processing system also provides synthesizing functionality for building an ST-CFG based on one or more smaller component ST-CFGs.

20 Claims, 15 Drawing Sheets

(56) References Cited

U.S. PATENT DOCUMENTS

| | | | |
|---|---|---|---|
| 2006/0053001 | A1 | 3/2006 | Brockett et al. |
| 2006/0106592 | A1 | 5/2006 | Brockett et al. |
| 2006/0106594 | A1 | 5/2006 | Brockett et al. |
| 2006/0106595 | A1 | 5/2006 | Brockett et al. |
| 2007/0150427 | A1* | 6/2007 | Geib ............ G06F 21/552 706/45 |
| 2007/0239454 | A1* | 10/2007 | Paek ............. G10L 15/19 704/257 |
| 2007/0282594 | A1 | 12/2007 | Spina |
| 2008/0208849 | A1 | 8/2008 | Conwell |
| 2009/0240487 | A1* | 9/2009 | Shen ............. G06F 17/2872 704/9 |
| 2009/0299724 | A1 | 12/2009 | Deng et al. |
| 2010/0048242 | A1 | 2/2010 | Rhoads et al. |
| 2010/0138216 | A1 | 6/2010 | Tanev |
| 2010/0161384 | A1 | 6/2010 | Wells |
| 2010/0197390 | A1 | 8/2010 | Craig et al. |
| 2011/0082684 | A1 | 4/2011 | Soricut et al. |
| 2011/0161076 | A1 | 6/2011 | Davis et al. |
| 2011/0295591 | A1 | 12/2011 | Fang et al. |
| 2012/0109623 | A1 | 5/2012 | Dolan et al. |
| 2012/0166175 | A1 | 6/2012 | Kopparapu |
| 2014/0019117 | A1 | 1/2014 | Ravi et al. |
| 2014/0156259 | A1 | 6/2014 | Dolan et al. |

OTHER PUBLICATIONS

Ambati, et al., "Active Learning and Crowd-Sourcing for Machine Translation," retrieved at <<http://mt-archive.info/LREC-2010-Ambati.pdf>>, Proceedings of the Seventh International Conference on Language Resources and Evaluation, May 2010, 6 pages.

Benotti, et al., "Corpus-based interpretation of instructions in virtual environments," retrieved at <<http://aclweb.org/anthology-new/P/P12/P12-2036.pdf>>, Proceedings of the 50th Annual Meeting of the Association for Computational Linguistics, Jul. 8, 2012, pp. 181-186.

"Natural Language: Understanding & Generating Text & Speech," retrieved at <<http://aitopics.net/NaturalLanguage>>, retrieved on Feb. 11, 2013, Association for the Advancement of Artificial Intelligence, 3 pages.

Wang, et al., "Crowdsourcing the Acquisition of Natural Language Corpora: Methods and Observations," retrieved at <<http://www.cs.cmu.edu/~yww/papers/wang_et_al_SLT2012.pdf>>, retrieved on Oct. 12, 2012, 6 pages.

Callison-Burch, et al., "Creating Speech and Language Data With Amazon's Mechanical Turk," retrieved at <<http://citeseerx.ist.psu.edu/viewdoc/download?doi=10.1.1.169.4021&rep=rep1&type=pdf>>, Proceedings of the NAACL HLT 2010 Workshop on Creating Speech and Language Data with Amazon's Mechanical Turk, 2010, 12 pages.

Sarikata, et al., "Iterative Sentence-Pair Extraction from Quasi—Parallel Corpora for Machine Translation," retrieved at <<http://www.cs.columbia.edu/~smaskey/papers/sent_select_mt.pdf>>, Proceedings of the 10th Annual Conference of the International Speech Communication Association, 2009, pp. 432-435.

O'Hagan, Minako, "Evolution of User-generated Translation: Fansubs, Translation Hacking and Crowdsourcing," retrieved at <<http://pmstrad.com/wp-content/JIAL_2009_1_2009_APA.pdf#page=102>>, The Journal of Internationalisation and Localisation, vol. 1, 2009, pp. 94-121.

Parent, et al., "Clustering dictionary definitions using Amazon Mechanical Turk," retrieved at <<http://www.aclweb.org/anthology-new/W/W10/W10-0703.pdf>>, Proceedings of the NAACL HLT 2010 Workshop on Creating Speech and Language Data with Amazon's Mechanical Turk, pp. 2010, 21-29.

Hu, et al., "Translation by Iterative Collaboration between Monolingual Users," retrieved at <<http://www.cs.umd.edu/hcil/monotrans/publications/hcomp10-changhu.pdf>>, Proceedings of the ACM SIGKDD Workshop on Human Computation, 2010, pp. 54-55.

Budiu, et al., "Parallelizing the Training of the Kinect Body Parts Labeling Algorithm," retrieved at <<http://research.microsoft.com/apps/pubs/default.aspx?id=170877>>, Big Learning: Algorithms, Systems, and Tools for Learning at Scale, Sierra Nevada, Spain, Dec. 16, 2011, 6 pages.

Shotton, et al., "Real-Time Human Pose Recognition in Parts from a Single Depth Image," retrieved at <<http://research.microsoft.com/pubs/145347/BodyPartRecognition.pdf>>, Proceedings of the 2011 IEEE Conference on Computer Vision and Pattern Recognition, 2011, 8 pages.

Rashtchian, et la., "Collecting Image Annotations Using Amazon's Mechanical Turk," retrieved at <<http://acm.org>>, Proceedings of the NAACL HLT 2010 Workshop on Creating Speech and Language Data with Amazon's Mechanical Turk, 2010, pp. 139-147.

Petrov, et al., "Learning Accurate, Compact, and Interpretable Tree Annotation," retrieved at <<http://www.petrovi.de/data/acl06.pdf>>, Proceedings of the 21st International Conference on Computational Linguistics and 44th Annual Meeting of the ACL, 2006, pp. 433-440.

Petrov, et al., "Learning Accurate, Compact, and Interpretable Tree Annotation," retrieved at <<http://nlp.cs.berkeley.edu/pubs/Petrov-Barrett-Thibaux-Klein_2006_Learning_slides.ppt>>, slide presentation, 2006, retrieved on Feb. 11, 2013, 38 pages.

Bannard, et al., "Paraphrasing with Bilingual Parallel Corpora," retrieved at <<http://acl.ldc.upenn.edu/P/P05/P05-1074.pdf>>, Proceedings of the 43rd Annual Meeting of the ACL, 2005, pp. 597-604.

"Painless Unsupervised Learning with Features," retrieved at <<http://aclweb.org/anthology-new/N/N10/N10-1083.pdf>>, Proceedings of the Human Language Technologies: The 2010 Annual Conference of the North American Chapter of the ACL, Jun. 2010, pp. 582-590.

Mohri, et al., "Regular Approximation of Context-Free Grammars Through Transformation," retrieved at <<http://citeseerxist.psu.edu/viewdoc/summary?doi=10.1.1.36.4448>>, Chapter 9 in Robustness in Language and Speech Technology, Jean-Claude Junqua and Gertjan van Noord (eds.), Kluwer Academic Publishers, 2000, pp. 251-261.

Matsuzaki, et al., "Probabilistic CFG with latent annotations," retrieved at <<http://acm.org>>, Proceedings of the 43rd Annual Meeting of the ACL, 2005, pp. 75-82.

Prescher, Detlef, "Inducing Head-Driven PCFGs with Latent Heads: Refining a Tree-Bank Grammar for Parsing," retrieved at <<http://citeseerx.ist.psu.edu/viewdoc/summary?doi=10.1.1.83.4755>>, Proceedings of the 16th European conference on Machine Learning, LNAI 3720, 2005, pp. 292-304.

Clark, Alexander, "Unsupervised Induction of Stochastic Context-Free Grammars using Distributional Clustering," retrieved at <<http://acm.org>>, Proceedings of the 2001 Workshop on Computational Natural Language Learning, vol. 7, Article No. 13, 2001, 8 pages.

Li, Chi-Ho, "Grammar Learning by Distributional Context," retrieved at <<www.cs.bham.ac.uk/~mgl/cluk/papers/li.ps>>, retrieved on Feb. 11, 2013, 7 pages.

Dolan, et al., "Generating Stimuli for Use in Soliciting Grounded Linguistic Information," U.S. Appl. No. 13/689,804, filed Nov. 30, 2012, 58 pages.

"International Search Report and Written Opinion", dated Oct. 17, 2014, Application No. PCT/US2014/016339, filed Feb. 14, 2014, 17 pages.

Cancedda, et al., "Corpus-based grammar specialization," Proceedings of the 2nd Workshop on Learning Language in Logic and the 4th Conference of Computational Natural Language Learning, vol. 7, Sep. 13, 2000, Lisbon, Portugal, pp. 7-12.

Keselj, et al., "A formal approach to subgrammar extraction for NLP," Mathematical and Computer Modelling, Pergamon Press, Oxford, GB, vol. 45, No. 3-4, Nov. 16, 2006, pp. 394-403.

Rayner, et al., "Fast parsing using pruning and grammar specialization", Proceedings of the 34th Annual Meeting on Association for Computational Linguistics, Morristown, NJ, Jun. 24, 1996, pp. 223-230.

Grishman, et al., "Automated determination of sublanguage syntactic usage", Proceeding of ACL '84 Proceedings of the 10th International Conference on Computational Linguistics and 22nd Annual Meeting on Association for Computational Linguistics, Stanford University, Jul. 2, 1984, pp. 96-100.

(56) References Cited

OTHER PUBLICATIONS

Yang Wang, et al., "Crowdsourcing the acquisition of natural language corpora: Methods and observations", Spoken Language Technology Workshop 2012 IEEE, Dec. 2, 2012, pp. 73-78.
Clark, Alexander, "Unsupervised induction of stochastic context-free grammars using distributional clustering", Proceedings of the 2001 Workshop on Computational Natural Language Learning, CONLL '01, vol. 7, Jul. 6, 2001, pp. 1-8.
Wu, "Stochastic inversion transduction grammars and bilingual parsing of parallel corpora", Computational Linguistics, vol. 23, No. 3, Jan. 1, 1997, p. 1-27.
Weng, et al., "Partitioning Grammars and composing Parsers", IWPT '95: Fourth International Workshop Parsing Technologies, Sep. 20, 1995, Prague, Czech Republic, Abstract, 14 Pages.
"Non-final Office Action Issued in U.S. Appl. No. 12/916,951", dated Jan. 21, 2014, 18 Pages.
"Final Office Action Issued in U.S. Appl. No. 13/689,804", dated Dec. 29, 2014, 13 Pages.
"Non Final Office action Issued in U.S. Appl. No. 13/689,804", dated Sep. 5, 2014, 13 Pages.
"Office Action & Search Report Received for Chinese Patent Application No. 201110358464.6", dated Jan. 6, 2014, 18 Pages.
Auger, Tom, "Crowdsourcing Word Press i18n, Tomauger.com", Retrieved from: https://web.archive.org/web/20151009231409/http://www.tomauger.com/2012/web-development/wordpress/crowdsourcing-wordpress-i18n, Nov. 6, 2012, 4 Pages.
Barzilay, Regina, "Extracting Paraphrases from a Parallel Corpus", In Proceeding of the 39th Annual Meeting on Association for Computatational Linguistics, Jul. 6, 2001, 8 Pages.
Buzek, et al., "Error Driven Paraphrase Annotation Using Mechanical Turk", InProceedings of the NAACL HLT 2010 Workshop on Creating Speech and Language Data with Amazon's Mechanical Turk, Jun. 6, 2010, pp. 217-221.
Denkowski, et al., "Tucker-Assisted Paraphrasing for English-Arabic Machine Translation", In Proceedings of the NAACL HLT 2010 Workshop on Creating Speech and Language Data with Amazon's Mechanical Turk, Jun. 6, 2010, pp. 66-70.
Marge, et al., "Using the Amazon Mechanical Turk for Transcription of Spoken Language", In IEEE International Conference on Acoustics Speech and Signal Processing, Mar. 14, 2010, pp. 5270-5273.
Marton, et al., "Improved Statistical Machine Translation Using Monolingually-Derived Paraphrases", In Proceedings of the Conference on Empirical Methods in Natural Language Processing, Aug. 6, 2009, pp. 381-390.
"International Search Report & Written Opinion for PCT Patent Application No. PCT/US2013/072531", dated Oct. 16, 2014, 10 Pages.
Resnik, et al., "Improving Translation via Targeted Paraphrasing", In Proceedings of the 2010 conference on empirical methods in natural language processing, Oct. 9, 2010, pp. 127-137.
Scanlon, Jessie, Luis von Ahn: The Pioneer of "Human Computation", Retrieved: https://www.bloomberg.com/news/articles/2008-11-03/luis-von-ahn-the-pioneer-of-human-computation-businessweek-business-news-stock-market-and-financial-advice, Nov. 3, 2008, 15 Pages.
Vondrick, et al., "Efficiently Scaling Up Video Annotation with Crowdsourced Marketplaces", In European Conference on Computer Vision, Sep. 5, 2010, 14 Pages.
Zhao, et al., "Robust Active Learning Using Crowdsourced Annotations for Activity Recognition", In Paper from the AAAI Workshop: Human Computation, Aug. 2011, pp. 74-79.

* cited by examiner

| Principal Character | Action Performed by Character | Prop | ... |
|---|---|---|---|
| Man<br>Woman<br>Girl<br>Boy<br>Dog<br>Cat<br>Mouse<br>⋮ | Dance<br>Jump<br>Throw<br>Crouch<br>Skip<br>Slip<br>Run<br>Walk<br>⋮ | Window<br>Door<br>Wall<br>Ball<br>Tree<br>Car<br>Bicycle<br>⋮ | ... |

EXAMPLE OF CLUSTERING TO REFINE GRAMMAR
WITH RESPECT TO TWO TYPES OF NPs

INDUCING AND APPLYING A SUBJECT-TARGETED CONTEXT FREE GRAMMAR

BACKGROUND

This disclosure pertains to a technique for inducing and applying a context free grammar. In general, a context free grammar (CFG) is described by a tuple G=(V, Σ, R, S). V defines a set of non-terminal symbols (NTs) that identify different syntactic categories. S corresponds to a particular kind of non-terminal symbol associated with a sentence as a whole. E defines a set of terminals that identify the actual words in a sentence. R defines a set of rules, each having the form NT→γ, where NT corresponds to any non-terminal symbol and γ corresponds to any combination of non-terminal symbols and terminals. For example, a top-level rule may indicate that S→NP VP, which indicates that a sentence is produced by a combination of a noun phrase (NP) and a verb phrase (VP). Other rules may specify permissible constructions of noun phrases and verb phrases, and so on. Each rule may also have a probability value associated with it, in which case the CFG corresponds to probabilistic CFG or PCFG.

Overall, a CFG generates a language L. The language L corresponds to the set of all sentences that can be expressed using the CFG. For example, a CFG may specify the rules used to construct any sentence in the English language. A developer designs this grammar with the aim of inclusiveness—that is, with the intent of encompassing every possible grammatical construct that is found in the English language, and ideally excluding all those sequences of words that do not correspond to grammatical English constructions.

A parser may be run on a sentence to indicate whether the sentence conforms to the rules specified in a particular CFG. A sentence which conforms to the rules is said to be grammatical with respect to the CFG. Otherwise, the sentence is said to ungrammatical. When operating in this role, the parser may be referred to as a recognizer.

SUMMARY

A processing system is described herein that receives a set of descriptions that pertain to a particular subject. The processing system induces a context free grammar (CFG) based on those descriptions. The CFG is particularly directed to the subject associated with the descriptions. For this reason, the CFG is referred to herein as a subject-targeted context free grammar, or ST-CFG.

The processing system can use the resulting ST-CFG to determine whether a new description is an appropriate (e.g., a grammatical) description of the subject. For example, assume that the subject pertains to a particular action depicted in a video snippet. The processing system can use the ST-CFG to determine whether the new description is an appropriate description of the action. By contrast, a CFG associated with the entire English language will simply indicate whether the new description is a properly formed English sentence.

According to another illustrative aspect, the processing system may form the ST-CFG by: (a) receiving descriptions that pertain to the defined subject; (b) parsing the descriptions using a subject-agnostic CFG, to provide parsed description information; (c) providing an unrefined subject-targeted context free grammar (ST-CFG) by retaining a subset of the first CFG that is used to parse the descriptions; and (d) refining the unrefined ST-CFG to produce a refined ST-CFG. The refined ST-CFG includes syntactic categories and rules which model the descriptions more accurately compared to the unrefined ST-CFG.

According to another illustrative aspect, a new subject may be decomposable into plural parts. In this case, the processing system can form an ST-CFG by assembling component CFGs associated with the plural parts, if available. In some cases, the processing system can form the ST-CFG in this manner without performing a crowdsourcing operation to collect descriptions.

The above approach can be manifested in various types of systems, components, methods, computer readable storage media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A provides a conceptual overview of one technique by which a processing system may induce a subject-targeted context free grammar (ST-CFG). Section B describes one implementation of the processing system. Section C describes illustrative methods which explain the operation of the functionality of Sections A and B. Section D describes illustrative computer functionality that can be used to implement any aspect of the features described in Sections A-C.

Figure 18:
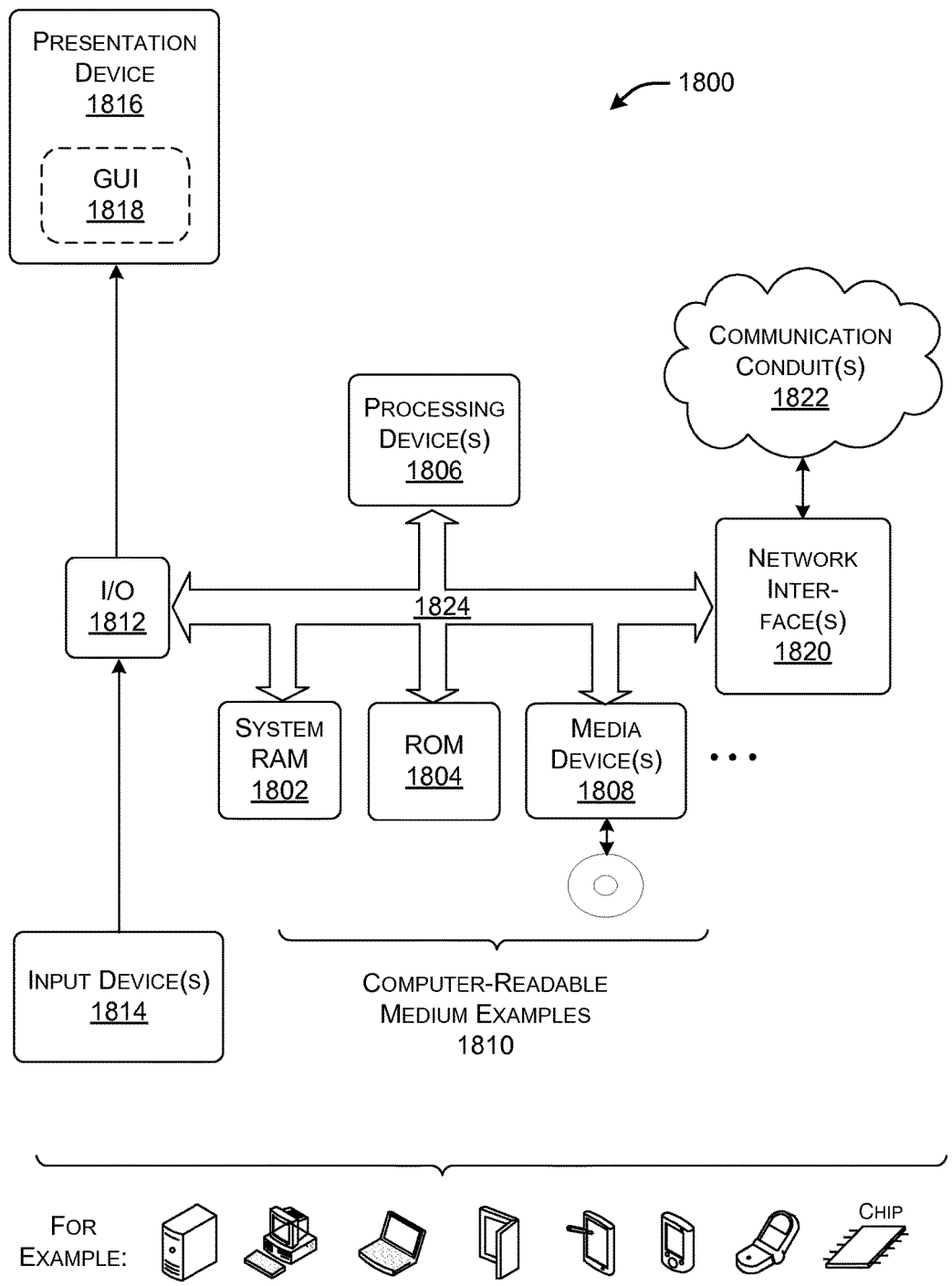
FIG. 18 shows illustrative computer functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 18, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/or any combination thereof. When implemented by a computing system, a logic component represents an electrical component that is a physical part of the computing system, however implemented.

The phrase "means for" in the claims, if used, is intended to invoke the provisions of 35 U.S.C. § 112, sixth paragraph. No other language, other than this specific phrase, is intended to invoke the provisions of that portion of the statute.

Figure 1:
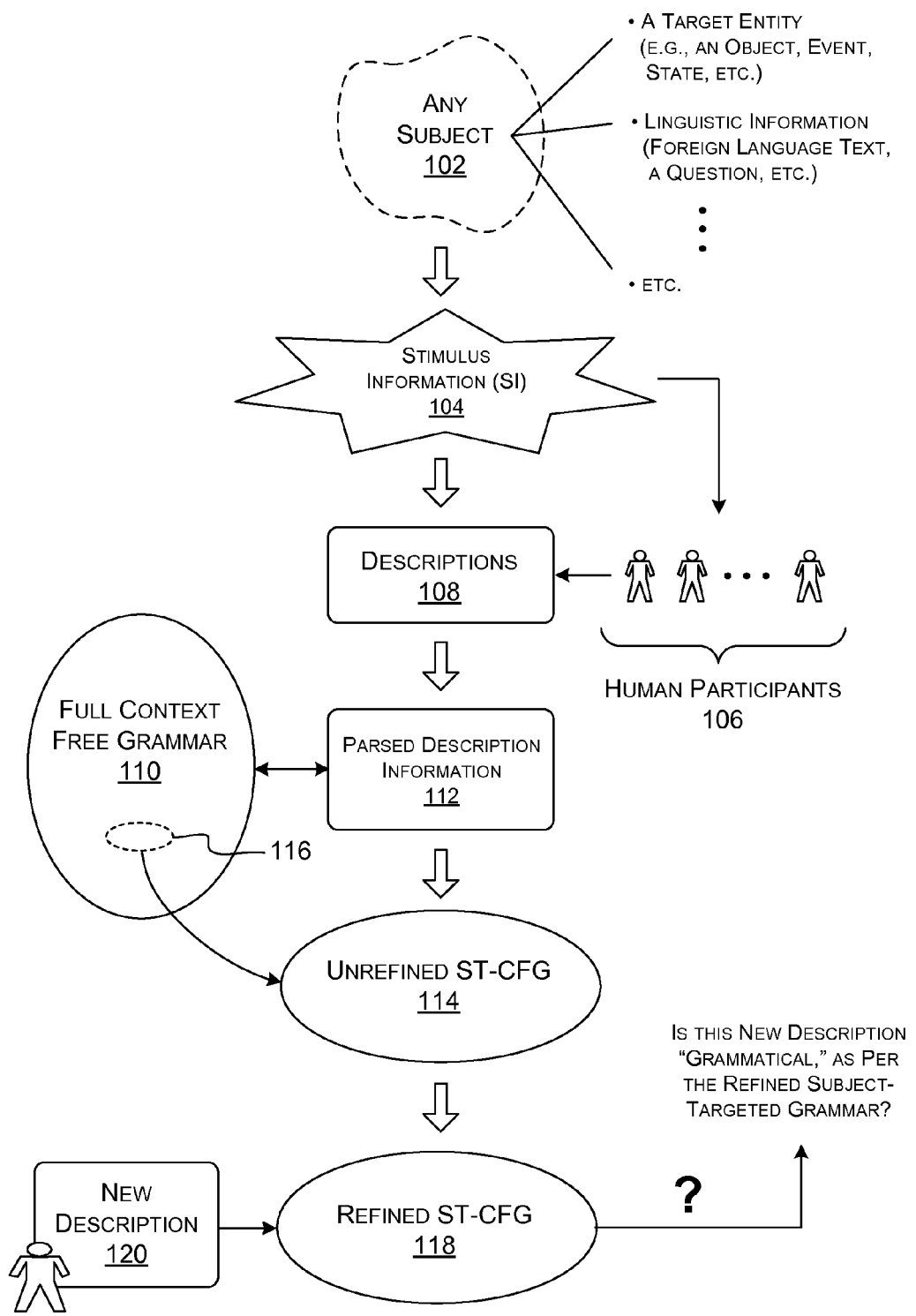
FIG. 1 shows a conceptual overview of one technique by which a processing system may induce a subject-targeted context free grammar (ST-CFG).

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations A. Conceptual Overview FIG. 1 summarizes a process by which a processing system may induce a context free grammar (CFG). The CFG defines a language that is made up of acceptable (that is, "grammatical") statements pertaining to a particular subject 102. As such, the CFG is referred to as a subject-targeted CFG or ST-CFG. In contrast, a conventional CFG is agnostic with respect to subject; that is, it may encompass all valid statements in a particular natural language (such as the English language), without regard to the topic of those statements.

The subject 102 corresponds to any focus of interest. For example, the subject 102 may pertain to a target entity. The target entity, in turn, may correspond to a physical object, a fictional object, a computer-generated object, a virtual object, etc. Alternatively, or in addition, the target entity may correspond to an event of any type. Alternatively, or in addition, the target entity may correspond to a state of any system. To cite merely one concrete example, a target entity may correspond to an action performed by a computer-generated character. In that case, the ST-CFG captures acceptable ("grammatical") statements that describe that action.

In another case, the subject 102 may pertain to an instance of linguistic information. For example, the subject 102 may pertain to a sentence in a first language (e.g., French). Here, the ST-CFG may define appropriate translations of the sentence in a second language (e.g., English). Or the ST-CFG may define appropriate ways of paraphrasing the sentence in the first language. In another case, the subject 102 may pertain to a question expressed in any natural language. Here, the ST-CFG may define appropriate answers to the question.

The above subjects are cited by way of example, not limitation; other implementations of the processing system can construct ST-CFGs that pertain to other subjects. Further, in some cases, the processing system can construct an ST-CFG that pertains to a subject which encompasses two or more sub-topics. Further, in some cases, the processing system can develop an ST-CFG without having advance knowledge of the subject to which it pertains.

As a first step in inducing an ST-CFG, the processing system can optionally produce an instance of stimulus information (SI) 104 that pertains to the subject. For example, assume that the subject 102 corresponds to an action performed by a computer-generated character. The instance of SI 104 in this case may correspond to a video snippet that depicts the character performing the action. The processing system then presents the instance of SI 104 to a group of human participants 106.

The participants 106 generate descriptions 108 that characterize the instance of SI 104, and then send those descriptions 108 to the processing system. As used herein, a "description" refers to any annotation of an instance of SI provided by a human participant in any language or combination of languages. The annotation is a description insofar that, from the perspective of the processing system, it can be used to characterize the instance of SI. In some cases, the participant enters a description with the express intent of explaining what he or she sees, or otherwise senses. In other cases, the participant enters information with other intent, and that information is treated, by the processing system, as a description. For example, a participant can react to an instance of SI by: (a) posing a question; (b) formulating a command; (c) expressing an evaluation; (d) expressing a personal reaction; (e) expressing a suggestion, and so on. All such non-limiting modes of expression constitute examples of descriptions, as that term is used herein.

Further, as used herein, a language refers to any system of expression by which two or more human beings may communicate with each other. Without limitation, a language encompasses commonly-spoken natural languages, such as English, French, Chinese, etc. A language also encompasses fictional or artificial languages, such as Esperanto, and programming languages, such as C++ or Java, etc.

The above-described manner of collecting information constitutes an active crowdsourcing technique. Alternatively, or in addition, the processing system can collect descriptions 108 in a more passive and/or indirect manner. For example, the processing system can collect a set of news articles that describe a particular event. The event in this case constitutes the subject, the news articles constitute the descriptions, and the authors of the articles serve the role of the participants 106. But those authors provide their descriptions in response to the event itself, rather than an instance of SI 104. And those authors provide their descriptions in connection with a newsgathering task that is unrelated to the technique summarized in FIG. 1. The processing system can leverage yet other sources of information to obtain the descriptions 108.

Next, the processing system parses the descriptions 108 using a full context free grammar (CFG) 110, to provide parsed description information 112. For example, the full CFG 110 may correspond to a general-purpose CFG associated with any natural language, such as English. The full CFG 110 defines appropriate sentences that can be expressed in the language, without respect to any particular subject or subjects. In this sense, the full CFG 110 may be regarded as subject-agnostic. The processing system can use any parsing technique to parse the descriptions 108, such as, but not limited to, the Cocke-Younger-Kasami (CYK) parsing technique. This parsing technique may produce a single parse or multiple possible parses.

Figure 2:
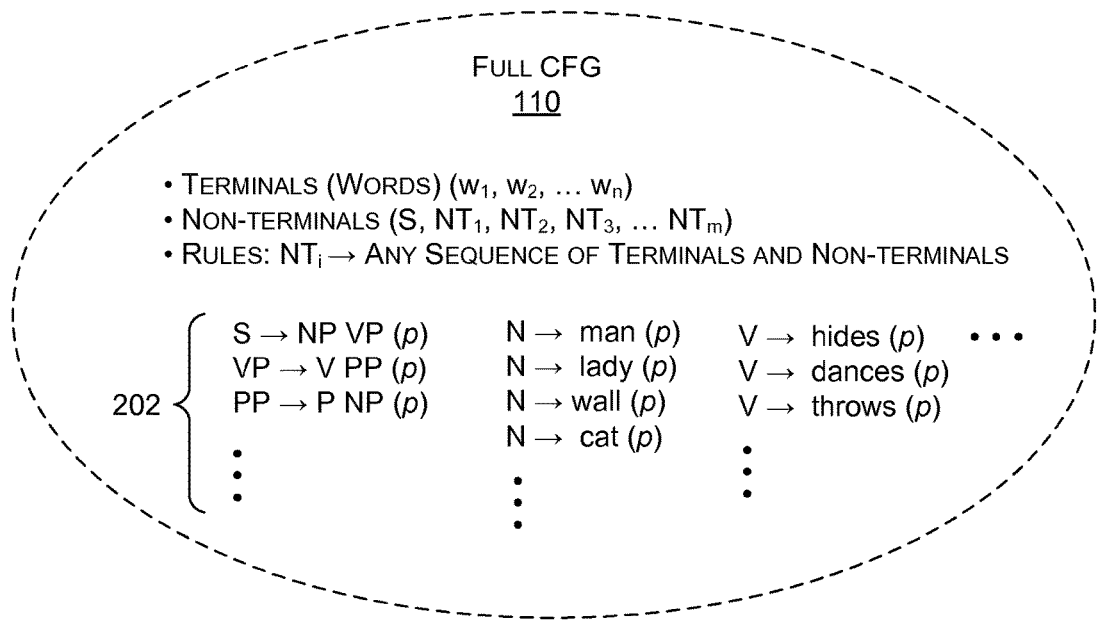
FIG. 2 shows an example of a full (subject-agnostic) context free grammar (CFG).

Jumping ahead momentarily in the sequence of figures, FIG. 2 shows a high-level representation of the full CFG 110. The full CFG 110 is defined by: (1) a set of non-terminal symbols that describe different syntactic categories, such as sentence (S), noun phrase (NP), verb phrase (VP), prepositional phase (PP), noun (N), verb (V), etc.; (2) a set terminals that correspond to words in the sentences; and (3) rules.

FIG. 2 also identifies a small sample of the rules 202 of the full CFG 110. In general, each rule has the form NT→γ, where NT corresponds to any non-terminal symbol and γ corresponds to any sequence of non-terminal symbols and/or any terminals. For example, one illustrative rule indicates that a sentence (S) is produced by a noun phrase (NP) and a verb phrase (VP). Another illustrative rule indicates that a verb phrase (VP) is produced by a verb (V) and a prepositional phrase (PP). Another illustrative rule indicates that a prepositional phrase is produced by a preposition (P) and a noun phrase (NP). Another set of rules indicate that a noun (N) produces various words in the English language, such as a man, lady, wall, cat, etc. Another set of rules indicate that a verb (V) produces various word in the English language, such as a hides, dances, throws, etc. Finally, the full CFG 110 assigns a probability to each rule, generically denoted by "p" in FIG. 2. The probability indicates the likelihood that a sentence in the English language includes content that is described by the rule.

Figure 3:
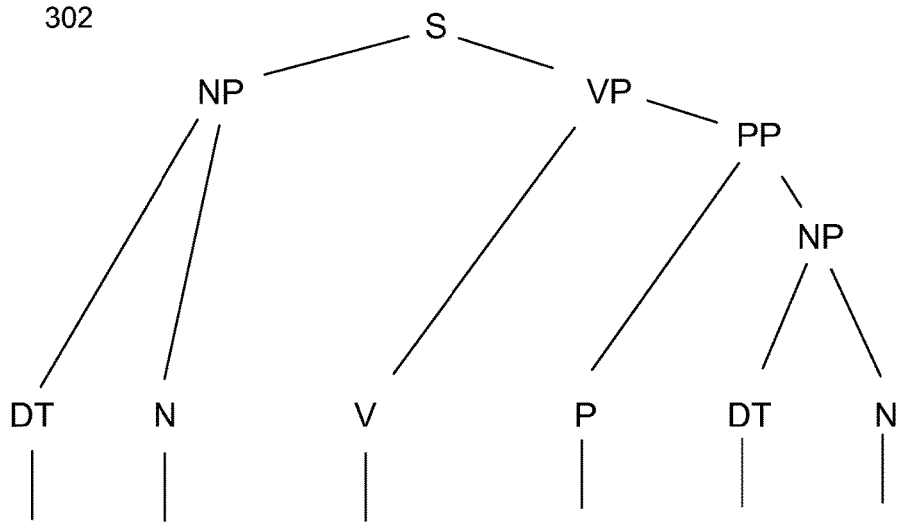
FIG. 3 shows a parse tree that may be produced using the full CFG.

FIG. 3 shows a parse 302 of the illustrative English sentence, "The man hides behind a wall." The parse is performed based on the full CFG 110 and is illustrated in the form of a hierarchical tree. More specifically, the parse 302 applies a first rule to indicate that the sentence includes a first noun phrase (NP) and a verb phrase (VP). The parse 302 applies a second rule to indicate that the first noun phrase (NP) includes a determiner (DT) and a noun (N). The parse 302 applies a third rule which indicates that the verb phrase (VP) includes a verb (V) and a prepositional phrase (PP). The parse 302 applies a fourth rule which indicates that the prepositional phrase (PP) includes a preposition (P) and a second noun phrase (NP). The parse 302 applies a fifth rule which indicates that the second noun phrase (NP) includes a determiner (DT) and a noun (N). Finally, the parse 302 applies a set of other rules which map the non-terminal symbols DT, N, V, P, DT, and N into, respectively, "The," "man," "hides," "behind," "a," and "wall." Each rule that is applied in the parse 302 has a probability associated with it (although not shown in FIG. 3).

Returning to FIG. 1, the processing system next provides an unrefined ST-CFG 114 based on the parsed description information 112. The unrefined ST-CFG 114 corresponds to a subset 116 of the full CFG 110 that is used in parsing the descriptions 108. For example, the rule PP→P NP is used to parse at least one sentence in the parsed description information 112. Therefore, this rule is included in the unrefined ST-CFG 114. The rule N→man is used to parse at least one sentence. Therefore, this rule is also present in the unrefined ST-CFG 114. An example of a rule which may not be present in the unrefined ST-CFG 114 is VP→V NP NP, corresponding to verb phrase that is produced by a ditransitive verb that takes two nominal objects, as in "He gave Joe the book." Another rule that may not be present in the unrefined grammar is NP→cat, insofar as the word "cat" is unlikely to be used by the participants 106 to describe the subject in question. Note that the language of this unrefined ST-CFG 114 recognizes all the descriptions 108 by construction, and likely many other expressions as well, only some of which are accurate descriptions of the subject.

The processing system next transforms the unrefined ST-CFG 114 into a refined ST-CFG 118. The refined ST-CFG 118 more accurately captures the semantic and syntactic structure of the descriptions compared to the unrefined ST-CFG 114. In one implementation, the processing system can use a clustering technique to define new non-terminal symbols, and to define new rules which utilize the new non-terminal symbols. The processing system adds these new rules to the unrefined ST-CFG 114 to create the refined ST-CFG 118.

To cite merely one example, the unrefined ST-CFG 114 may include a single rule which indicates that a noun phrase is produced by any determiner (DT) defined by the grammar and any noun (N) defined by the grammar. It may be the case, however, that some nouns predominantly serve the role of subjects in sentences, and other nouns predominantly serve the role of objects in sentences. The processing system can use the refinement process to define new non-terminal symbols and associated rules that distinguish between these two uses of noun phrases. These refined rules will have the effect of constraining the permissible constructions defined by the refined ST-CFG. For example, the unrefined ST-CFG may define the following sentence as a permissible construction: "The wall hides behind the man." The refined ST-CFG may exclude such a construction, or at least identify that construction as highly unlikely.

As a point of clarification, FIG. 1 illustrates the process of producing a refined ST-CFG in three steps to facilitate explanation. But the process need not be implemented as three distinct and separate operations, and/or the process need not be implemented in the order identified in FIG. 1. For example, in one case, the parsing operation can produce parsed description information 112 and the refining operation can directly refine the symbols and rules that are represented in the parsed description information 112. In this case, the operation of extracting an unrefined ST-CFG 114 is implicitly performed by the parsing operation, insofar as this operation inherently captures or contains a subset of rules in the full CFG 110. In the context of FIG. 1, the oval labeled "unrefined ST-CFG" 114 may be considered as subsumed by the box labeled "parsed description information 112, insofar as the oval labeled "unrefined ST-CFG" 114 conveys a property of the parsed description information 112. As such, the process need not include a discrete step of extracting and storing the unrefined ST-CFG 114. But, in other implementations, the process may in fact include such an operation.

FIG. 1 also illustrates one way in which the refined ST-CFG 118 may be applied. In this application, a user or some other entity inputs a new description 120. The processing system analyzes the new description 120 using the refined ST-CFG 118, to produce an analysis result. The processing system can perform this task by using a parser or a finite automata, as will be described below. The analysis result indicates whether the analysis was successful or unsuccessful. A successful analysis result indicates that the new description 120 is valid description of the subject 102, while an unsuccessful analysis result indicates that the new description 120 is an invalid description of the subject 102. The processing system will produce an unsuccessful analysis result when it cannot find a likely interpretation of a new description using the rules in the ST-CFG. Less formally stated, the processing system applies the refined ST-CFG 118 to indicate whether the new description 120 is sufficiently similar to the semantic and syntactic content of the descriptions 108.

Figure 4:
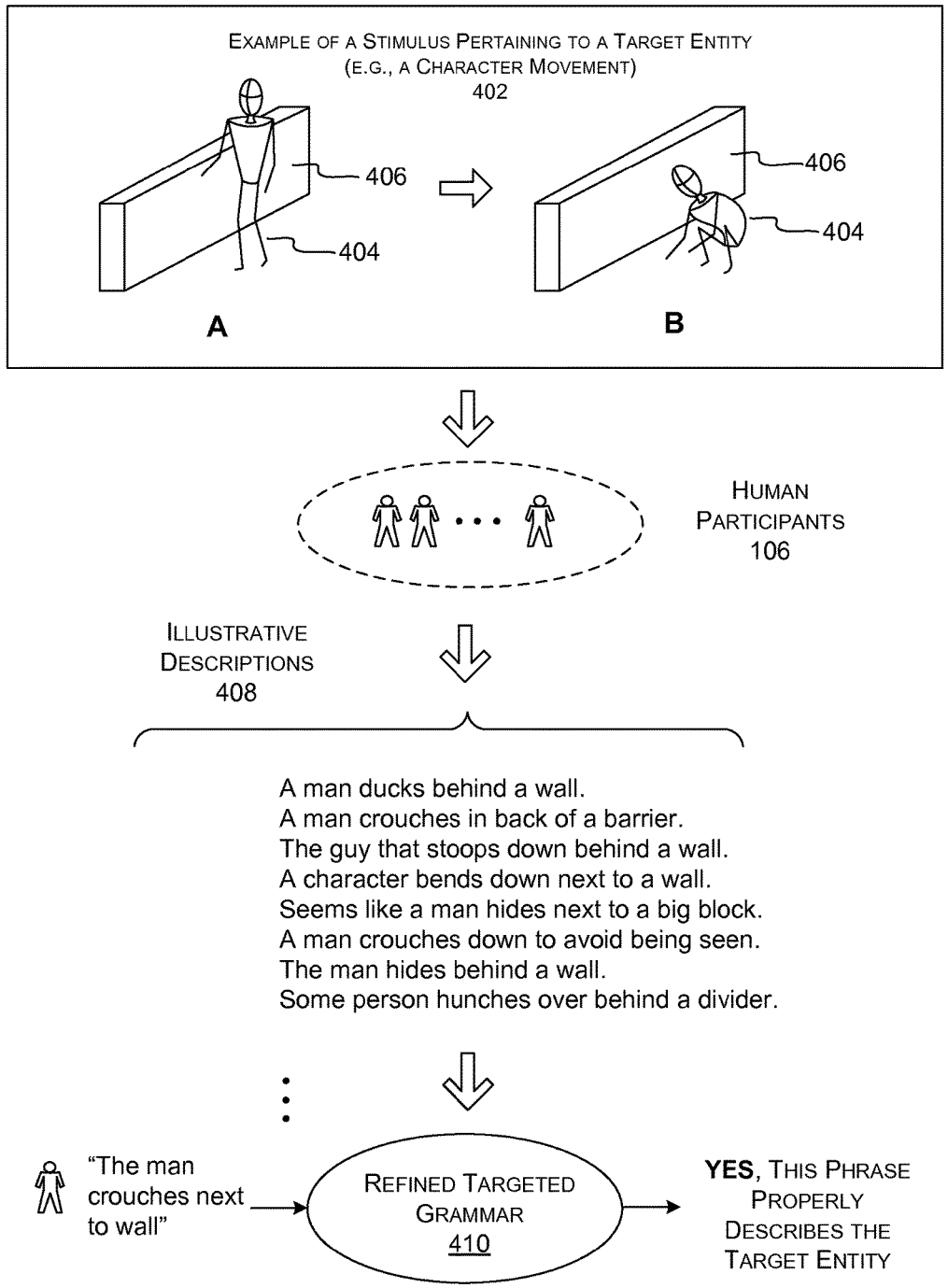
FIG. 4 shows an instantiation of the principles of FIG. 1. Here, the processing system induces an ST-CFG that describes an action depicted in a video snippet.

FIG. 4 shows a particular instantiation of the concepts set forth in FIG. 1. The instance of stimulus information (SI) 402 in this case corresponds to a short video. The video shows a computer-generated man 404 which performs the action of hiding behind a wall 406. The subject expressed by this instance of SI 402 may correspond to the action of crouching behind an object. The subject may also pertain to aspects of the principal character (a man) who is performing the action, and the nature of the object (a wall) behind which the character hides.

More specifically, the processing system can guide the participants 106 in focusing on the intended subject of a video based on the instructions that it provides to the participants 106. For example, suppose that the subject narrowly pertains to the action that is being performed. The following instruction may be appropriate to guide the participants 106 in entering descriptions which focus on the action itself: "Please describe the action that this man is performing in the video." The processing system can solicit a broader range of descriptions using the following instruction: "Please describe what you see in this video."

Upon viewing the instance of SI 402, the human participants 106 enter a plurality of descriptions 408. For example, one participant may describe the action as, "The man ducks behind a wall," while another may explain the action as "The man crouches in back of a barrier," and so on. However, as set forth above, the descriptions 408 need not take the form of explanations. For example, one errant participant might enter the comment, "Why is he hiding?"

The processing system produces a refined ST-CFG 410 based on the descriptions 408 using the technique summarized in FIG. 1. In an application phase, a user may input the new description, "A man crouches next to a wall." The processing system analyzes the new description based on the refined ST-CFG 410 to provide an analysis result (e.g., a parsing result in the case that a parser is used). The analysis result indicates whether the new description is an appropriate description of the instance of SI 402. It is likely that this new description will be regarded as grammatical, since it is semantically and syntactically similar to the other descriptions 408.

B. Illustrative Implementation of the Processing System

B.1. Overview of the Illustrative Implementation

Figure 5:
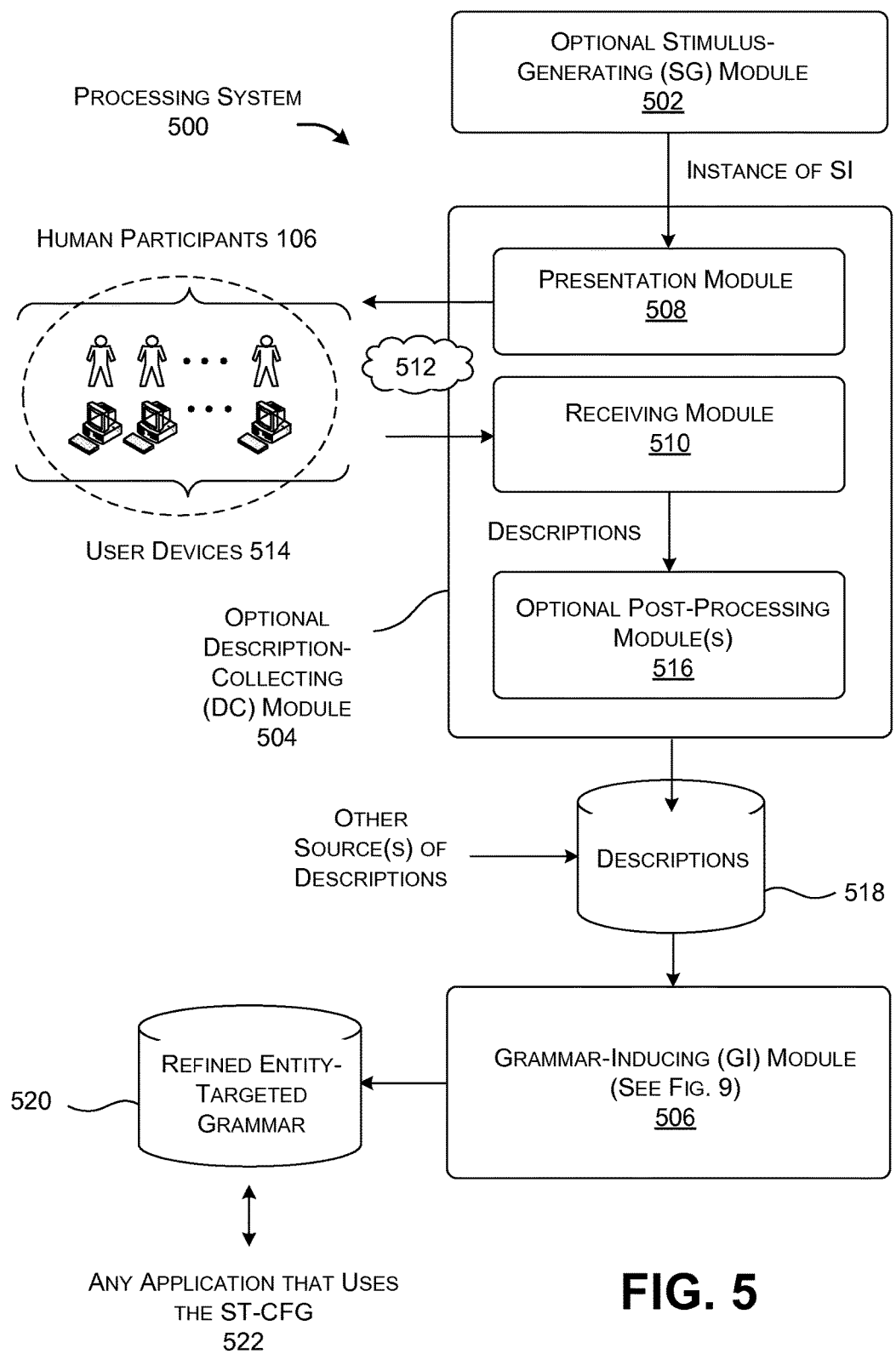
FIG. 5 shows one implementation of a processing system that performs the processing depicted in FIG. 1.

FIG. 5 shows an illustrative processing system 500 that implements the principles set forth in FIG. 1. The principal components of the processing system 500 include: an optional stimulus-generating (SG) module 502 for generating stimulus information (SI); an optional description-collecting (DC) module 504 for presenting the SI to a group of human participants 106, and, in response, collecting descriptions offered by the participants 106; and a grammar-inducing (GI) module 506 for inducing a subject-targeted context free grammar (ST-CFG) based on the descriptions.

FIG. 5 illustrates the processing system 500 as a single collection of functional components to facilitate explanation. In some cases, the processing system 500 may indeed comprise an integrated collection of functional components associated with a single physical system. But, in general, the functional components shown in FIG. 5 can be implemented by any number of separate physical systems. The separate physical systems can be located at a single site or distributed among two or more sites. The separate physical systems can furthermore be administered by a single entity or administered by two or more entities. For example, a first entity may produce the SI, a second entity may collect descriptions based on the SI, a third entity may induce the ST-CFG based on the descriptions, and a fourth entity may use the ST-CFG in a grammar-checking operation.

Each functional component shown in FIG. 1 can be implemented by any type of physical system. For example, in one representative implementation, the SG module 502, the DC module 504, and the GI module 506 can each be implemented by one or more server computers and associated data store(s). In some implementations, these server computers can be accessible via a wide area network (such as the Internet). Alternatively, or in addition, any of the SG module 502, the DC module 504, and the GI module 506 can be implemented by a local computing device of any type, e.g., a personal computer, a laptop-computer device, a tablet-type computer device, a game console device, a set-top box device, a mobile telephone device (e.g., a smartphone device), a personal digital assistant device, a book reader device, a portable game playing or music playing device, and so on.

This subsection (Subsection B.1) will present an overview of the functional components shown in FIG. 5, explaining the components from a generally top-to-bottom manner. The following subsections will present additional illustrative detail regarding each of the above-identified principal components shown in FIG. 5.

To begin with, the SG module 502 generates SI expressed in any medium or combination of media. In one case, the SI corresponds to an animated visual presentation. For example, the animated visual presentation may correspond to computer-generated information, such as animated cartoon-like information. Alternatively, or in addition, the animated visual presentation may correspond to video information captured using a camera of any type (or types). In another case, the SI may correspond to a static visual presentation, e.g., a static image or a set of static images. In another case, the SI may correspond to an audio presentation. These examples are cited by way of illustration, not limitation; still other options are possible.

In the example of FIG. 4, the SG module 502 has produced an instance of SI having a single component. In other cases, the SG module 502 may produce an instance of SI that invites the participants to compare two or more parts of the SI. For example, the SG module 502 can produce side-by-side videos or images which differ from each other in one or more ways. For example, the SG module 502 can produce side-by-side videos of the same character, where the character performs an action in the second video that is not performed in the first video. Or an object may be present in the second video that is not present in the first video. The DC module 504 may then instruct the participants 106 to describe the difference(s) between the two videos. Still other examples of SI are possible.

The DC module 504 can use a presentation module 508 for distributing the instances of SI to the participants 106. As described above, the DC module 504 may invite the participants 106 to provide descriptions in any manner and in any language(s). For example, the DC module 504 may instruct the participants 106 to "Describe the action that is taking place in the video." The DC module 504 can then use a receiving module 510 to collect the descriptions provided by the participants 106.

The processing system 500 can use any mechanism to perform the above-described tasks. For example, in one case, the presentation module 508 can send the instances of the SI to the participants 106 via any type of network 512, such as a wide area network (e.g., the Internet). Each of the participants 106 can use any type of user device to present instances of SI. Illustrative types of user devices 514 include personal computers, laptop computers, tablet-type computers, mobile telephones (e.g., smartphones), personal digital assistant devices, book reader devices, etc. The participants 106 can then use the user devices 514 to express their descriptions, and then to send the descriptions to the receiving module 510 via the network 512.

An optional post-processing module 516 can perform analysis on the descriptions to improve the quality of the descriptions. For example, the descriptions may include noise that reflects eccentric descriptions provided by some of the participants 106. For example, most of the participants 106 can be expected to offer descriptions which focus on an intended principal theme of an instance of SI. But other participants may, for whatever reason, provide descriptions that focus on tangential features of the SI. The post-processing module 516 can remove these errant descriptions using any technique, such as by clustering the descriptions and removing outlying content that does not belong to any of the principal clusters.

Finally, the DC module 504 can store the descriptions that it collects in a data store 518. The descriptions that are stored may correspond to the original descriptions received by the receiving module 510, and/or the processed descriptions provided by the post-processing module 516.

Alternatively, or in addition, the processing system 500 may receive descriptions from some other source or sources. For example, in the example set forth in Section A, the processing system 500 may receive descriptions from a corpus of news information or the like. In this case, the processing system 500 leverages the descriptions that may have been generated for some purpose that is unrelated to the generation of a context free grammar.

The GI module 506 processes the descriptions to produce a refined ST-CFG. The GI module 506 may then store the refined ST-CFG in a data store 520. One or more applications 522 may use the refined ST-CFG. In one case, an application may use the refined ST-CFG to determine whether a new description is a valid description of the subject associated with the ST-CFG.

B.2. Stimulus-Generating Module

Figures 6, 7:
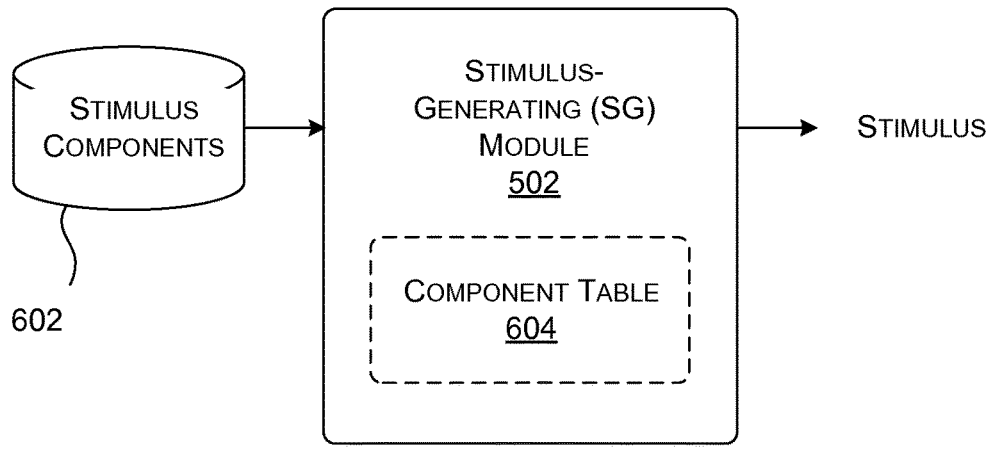
FIG. 6 shows one implementation of a stimulus-generating (SG) module. The SG module produces instances of stimulus information (SI) for use in the processing system of FIG. 5.
FIG. 7 shows a component table for use by the SG module of FIG. 6.

FIG. 6 shows one implementation of the stimulus-generating (SG) module 502 introduced in FIG. 5. The SG module 502 produces instances of SI. As explained above, the processing system 500 uses the instance of SI to solicit descriptions from the participants 106. The SG module 502 is an optional component in the processing system 500; this is because, as noted above, the processing system 500 can collect descriptions without actively soliciting those descriptions from the participants 106.

In one implementation, the SG module 502 builds the SI by selecting one or more parts that are stored in a data store 602. Each part is referred to herein as a stimulus component (SC), and the collection of parts is referred to as an inventory of SCs. The SCs may also be regarded as templates. Possible types of SCs include, but are not limited to: video snippets; audio snippets; programmatic descriptions of poses or actions; images; graphical models; parameter settings; programmatic states; texture information, and so on, or any combination thereof.

Again consider the example of FIG. 4, which shows a man crouching behind a wall. A first SC that contributes to the SI may produce a male principal character. A second SC may produce the wall. A third SC may create the crouching action performed with respect to the wall. More specifically, the SC associated with a man may constitute a texture which can be "pasted" onto a three-dimensional mesh of a figure. The SC associated with the wall may likewise constitute a texture in combination with a three-dimensional mesh. The SC associated with the action may correspond to a sequence of poses performed by the principal character.

In one implementation, the SG module 502 may select the SCs with the aid of a component table 604. The component table 604 may parametrically identify the collection of SCs that are available for use in constructing an instance of SI.

For example, FIG. 7 shows a component table 702 which parametrically describes different SCs that may be used to construct an instance of SI that corresponds to a video snippet. The component table 702 may organize the SCs into different environment-specific categories. For example, a first column identifies different types of principal characters that may appear in the SI, such as Man, Woman, Girl, Boy, etc. A second column identifies different types of actions that the principal character may perform, such as Dance, Jump, Throw, Crouch, etc. A third column identifies different props that the principal character may use when performing the action, such as Window, Door, Wall, etc. A fourth column (not shown) identifies a prepositional relationship that binds the principal character, the action, and the prop, such as by indicating that that the action takes place in front of the prop, in back of the prop, etc. This simplified categorization of options is merely one illustrative way of discretizing action taking place in an instance of SI. Likewise, the selection of options in any column is merely representative. Other implementations can include a more encompassing collection of objects, actions, relations, etc.

The SG module 502 can use any technique to select options from the component table 604, to thereby construct a particular instance of SI. For example, the SG module 502 can randomly select one option from each column to create the SI. Alternatively, or in addition, the SG module 502 can systematically select different permutations of options based on any selection plan, to thereby carry out any data collection regimen.

In one case, the SG module 502 operates in a fully automated manner. In another case, the SG module 502 operates in a semi-automated or completely manual manner. In the last-mentioned case, a user may manually select options from the component table 604 to create an instance of SI.

B.3. Description-Collecting Module

The DC module 504 can use different crowdsourcing techniques to solicit linguistic descriptions from the participants 106. In a first technique, the DC module 504 can use a pre-established crowdsourcing platform to collect the descriptions. For example, the DC module 504 can use the Amazon Mechanical Turk platform provided by Amazon.com of Seattle, Wash. In general, the participants 106 may receive payment for their work (and/or some other form of reward), or may be expected to provide their services for free.

The DC module 504 can use other mechanisms to collect descriptions, including, but not limited to: a search system; a game playing platform; a social network application; a communication mechanism (such as an instant messaging application, a mobile telephone application, etc.); a collaborative application, and so on.

Figure 8:
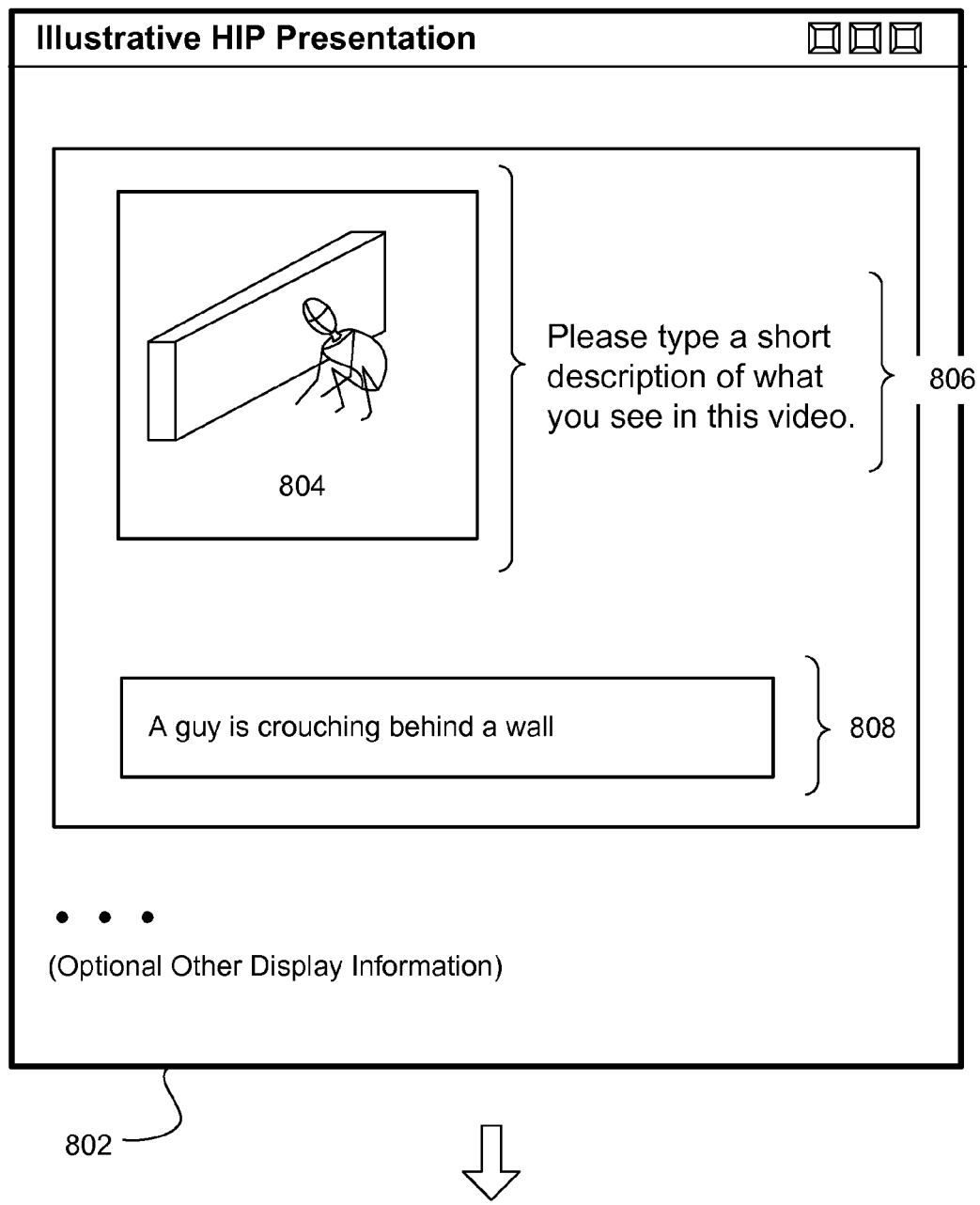
FIG. 8 shows an illustrative Human Interactive Proof (HIP) presentation that the processing system may use to convey an instance of SI to human participants.

In another technique, the DC module 504 can present instances of SI within a challenge-response authentication task, referred to herein as a Human Interactive Proof (HIP) task. FIG. 8 shows an example of a HIP presentation 802 that incorporates SI 804 produced by the SG module 502. In this case, the SI 804 corresponds to a cartoon-like animation of a man crouching behind a wall. The HIP presentation 802 may include text 806 and/or audio information that instructs the participant to enter a linguistic description of the SI 804. The HIP presentation 802 may also include an input mechanism 808 for receiving the participant's description.

B.4. Overview of the Grammar-Inducing Module

Figure 9:
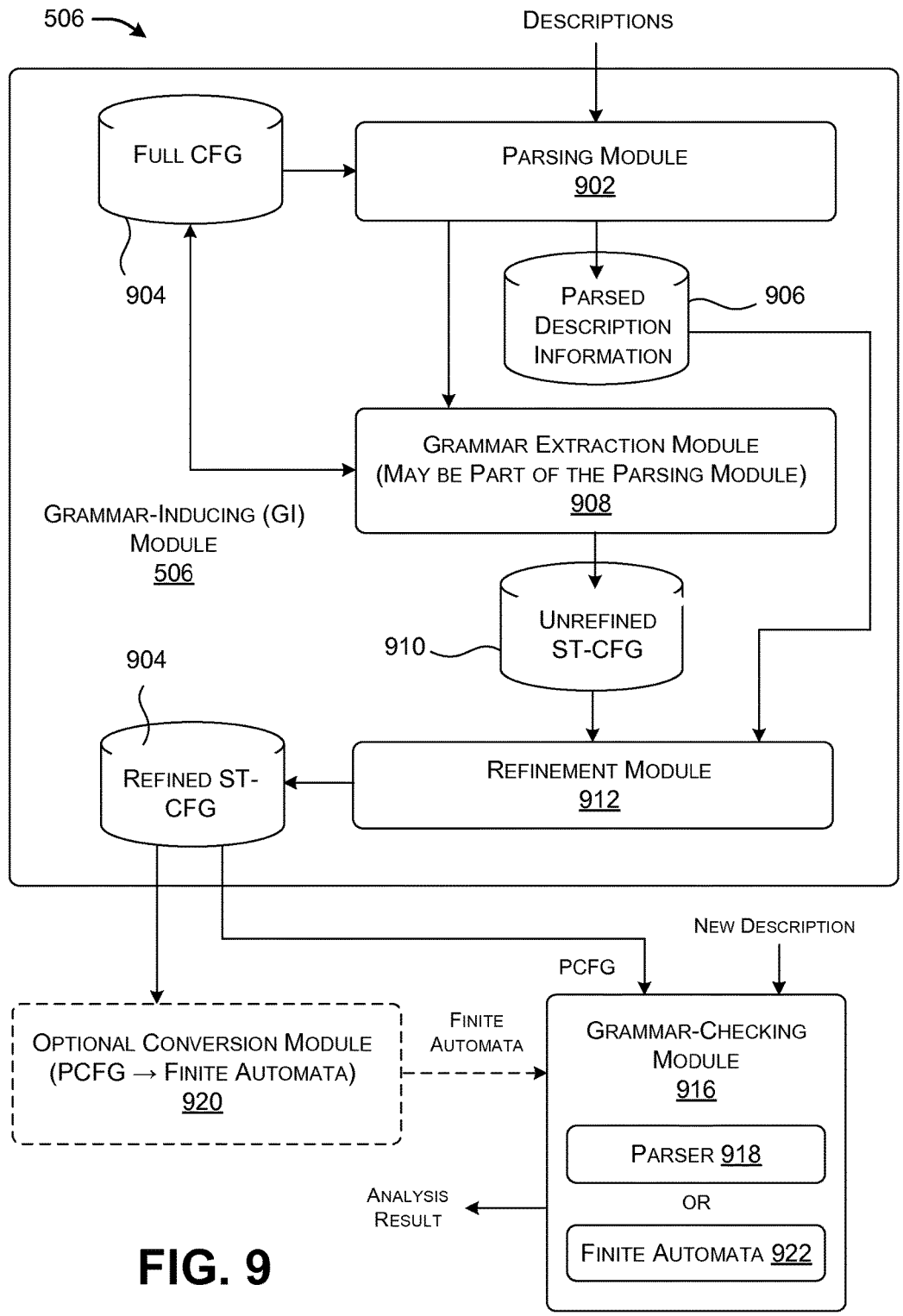
FIG. 9 shows one illustrative implementation of a grammar-inducing (GI) module for use in inducing ST-CFGs. The GI module is a component of the processing system of FIG. 5.

FIG. 9 provides an overview of the grammar-inducing (GI) module 506. The GI module 506 produces a refined ST-CFG using the technique described in Section A. The components of the GI module 506 can be implemented by a single computer device or by plural computer devices. In the latter case, the computer devices can be provided at a single location or may be distributed over plural locations.

The GI module 506 receives a set of descriptions that are collected by the DC module 504 and/or received from any other source(s). A parsing module 902 parses the descriptions based on a full CFG provided in a data store 904. As explained above, the full CFG provides rules associated with a language (such as the English language) without regard to any particular subject or subjects, and therefore may be considered subject-agnostic. In one implementation, the parsing module 902 can use a dynamic programming technique to parse the descriptions, such as, without limitation, the Cocke-Younger-Kasami (CYK) technique or the Earley technique, etc. The parsing module 902 produces parsed description information. The parsing module 902 may store the parsing description information in a data sore 906.

A grammar extraction module 908 forms an unrefined ST-CFG. The grammar extraction module 908 operates by storing a subset of the full CFG that is used to parse the descriptions. Stated in the negative, the grammar extraction module 908 will exclude those rules that do not play a part in parsing any description. In other cases, the grammar extraction module 908 may also exclude any rules that are used to parse some descriptions, but are nevertheless infrequently used. The grammar extraction module 908 may optionally store the unrefined ST-CFG in a data store 910.

A refinement module 912 refines the unrefined ST-CFG to produce a refined ST-CFG. As explained above, the refinement module 912 produces additional non-terminal symbols and rules which enable the ST-CFG to more accurately model the descriptions, compared to the unrefined ST-CFG. The refinement module 912 may store the refined ST-CFG in a data store 914.

In another implementation, the parsing module 902 may be considered as encompassing the function of the grammar extraction module 908. That is, as explained above, the output of the parsing module 902 can be said to implicitly extract a subset of rules in the full grammar by virtue of its selective application of those rules. A separate grammar extraction module 908 need not perform the formal step of identifying and storing those rules.

A grammar-checking module 916 determines whether a new description conforms to the ST-CFG. To perform this task, the grammar-checking module 916 may employ a parser 918. The parser 918 can apply any parsing technique, such as, but not limited to, the Cocke-Younger-Kasami (CYK) technique or the Earley technique, etc.

Alternatively, a conversion module 920 can apply any known technique for converting a CFG grammar into a finite automata 922. In one approach, the conversion module 920 operates by converting the CFG into a strongly regular grammar, corresponding to a grammar without self-embedding. The conversion module 920 then converts the strongly regular grammar into a finite automata. Although any conversion technique can be used to perform this conversion, a representative CFG-to-finite-automata technique that may be used is described in Mohri, et al., "Regular Approximation of Context-Free Grammars Through Transformations," in *Robustness in Language and Speech Technology*, Junqua, et al. (eds), Kluwer Academic Publishers, The Netherlands, 2000, pp. 151-161.

The grammar-checking module 916 can determine whether a new description conforms to the ST-CFG by inputting it into the finite automata 922, without performing a parsing operation. The elimination of the parser 918 may expedite the checking operation performed by the grammar-checking module 916.

B.5. Refinement Module

Figure 10:
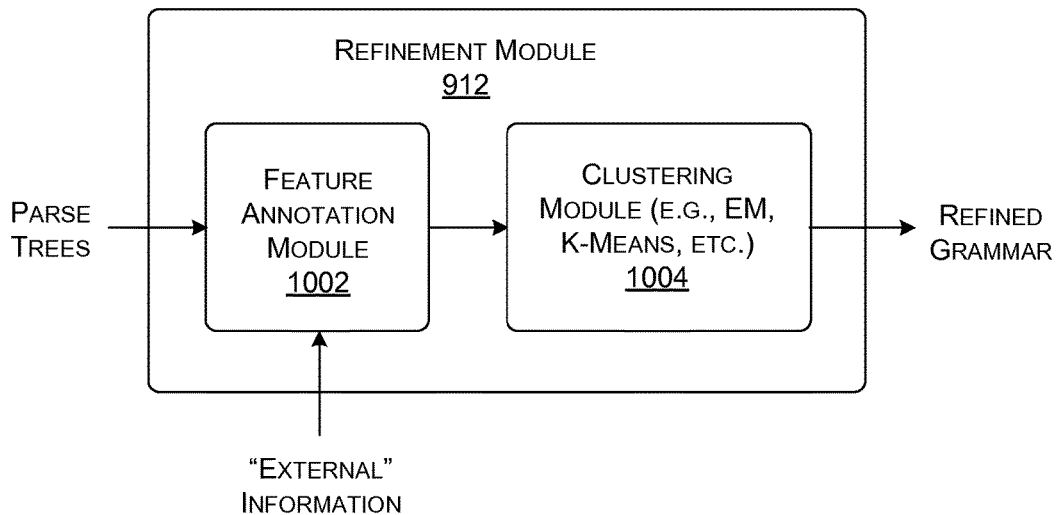
FIG. 10 shows one illustrative implementation of a refinement module. The refinement module is a component of the GI module of FIG. 9.

FIG. 10 describes one implementation of the refinement module 912. As explained above, the refinement module 912 may operate by adding new non-terminal symbols and rules to the unrefined ST-CFG, to produce the refined ST-CFG. The refined ST-CFG more accurately and narrowly describes the set of valid statements that can be made about the subject, compared to the unrefined ST-CFG.

In one implementation, the refinement module 912 may be conceptualized as including a feature annotation module 1002 and a clustering module 1004. The feature annotation module 1002 receives the parse trees produced by the parsing module 902. The feature annotation module 1002 then annotates the elements of the parse trees with features, to produce annotated description information. An element of a parse tree may correspond to any node of the parse tree or sequence of nodes, e.g., including any non-terminal symbol(s) and/or any terminal(s) (e.g., any word(s)). A feature corresponds to any characteristic or aspect of an element. The clustering module 1004 then clusters the annotated description information into two or more categories, if possible. In some cases, the clustering module 1004 directly produces new non-terminal symbols, as well as rules that utilize the new non-terminal symbols. In another case, the results of the clustering module 1004 may be leveraged to produce new non-terminal symbols and rules.

The refinement module 912 can implement the feature annotation module 1002 and the clustering module 1004 in different ways. Without limitation, a first implementation uses a distributional clustering paradigm to refine the grammar. A second implementation uses an expectation-maximization (EM) algorithm to refine the grammar by associating latent symbols with the non-terminal symbols in the parse trees. Yet other implementations are possible.

In the first implementation, the feature annotation module 1002 can identify the context associated with each element. The feature annotation module 1002 can then annotate the element with one or more features that describe the context, which may be expressed as a feature vector. For example, assume that an element corresponds to a particular word in a sentence. That is, assume that the element corresponds to a particular terminal in a parse tree. In that case, the feature annotation module 1002 may provide a feature which describes any lexical content which precedes the element in the sentence, and another feature which describes any lexical content which follows the element in the sentence. The feature annotation module 1002 may also provide a feature which describes a parent non-terminal symbol associated with the word. In another scenario, assume that the element corresponds to a particular non-terminal symbol in a parse tree. In that case, the feature annotation module 1002 can provide one or more features which describe any ancestor, parent, and/or child nodes in the parse tree with respect to the identified non-terminal symbol. The feature annotation module 1002 can extract yet other kinds of contextual information from a parse tree.

The clustering module 1004 can then group the feature vectors (and associated elements) into categories by leveraging the principle that elements with similar context belong to the same category. The clustering module 1004 can use different clustering techniques to perform this task, such as, without limitation, the k-means clustering technique. The clustering module 1004 can use any distance metric (or combination of metrics) to determine the similarity of one feature vector with respect to another feature vector. For example, the clustering module 1004 can use a L1-norm metric, or a cosine similarity metric, etc.

In one case, the clustering module 1004 can attempt to form a prescribed total number clusters, e.g., by iteratively refining k clusters at the same time. In another case, the clustering module 1004 can perform clustering in a hierarchical fashion. For example, the clustering module 1004 can first attempt to establish two main categories of elements. The clustering module 1004 can then attempt to split each of these two categories into two respective child categories. The clustering module 1004 can continue this splitting process until the categories that are produced fail to sufficiently distinguish from each other, as measured by any cluster-similarity metric. Through an annealing or merging process, the clustering module 1004 can also remove the effects of any clustering operation that does not yield meaningfully distinct categories, as measured by any cluster-similarity metric.

After forming clusters, the clustering module 1004 can identify new rules associated with those clusters. For example, assume that the clustering operation identifies clusters that map to two different types of noun phrases. In response, the clustering module 1004 or a human annotator can select new non-terminal symbols associated with the different categories of noun phrases. The clustering module 1004 or a human annotator can then add rules which utilize the new non-terminal symbols. The clustering module 1004 can assign a probability to each new rule that depends on the number of times that the rule applies within the parsed description information, relative to an appropriate normalization factor (such as the number of times that any type of noun phrase is applied within the parsed description information).

Next consider the second implementation that uses the expectation-maximization (EM) approach. In this implementation, the feature annotation module 1002 may associate two or more latent symbols with each non-terminal symbol in each parse tree. The latent symbols constitute features; they also effectively define new non-terminal symbols. The feature annotation module 1002 also defines new rules that utilize the new non-terminal symbols.

The clustering module 1004 then uses the expectation-maximization algorithm to iteratively adjust the probabilities of the rules in the parse trees. That is, in this EM process, the actual sentences associated with the descriptions constitute observations. The probabilities of the new rules constitute hidden information. The EM technique iteratively adjusts the probabilities to maximize the likelihood of the observed sentences.

In one case, the feature annotation module 1002 can associate a total number of k latent symbols with each non-terminal symbol in the parse trees. The EM technique can then attempt to adjust the probabilities of the rules with respect to all of these latent symbols at the same time. In another case, the EM technique can perform hierarchical clustering. In this approach, the refinement module 912 splits each non-terminal symbol into just two latent symbols to produce annotated description information, and then performs clustering based on that annotated description information. The refinement module 912 then splits each previous latent symbol into two additional "child" latent symbols and then performs clustering on this refined annotated description information. The refinement module 912 repeats this processing so long as it continues to yield meaningfully distinct clusters, as assessed by any cluster-similarity metric. The refinement module 912 can remove the effects of any clustering operation that fails to yield meaningfully distinct clusters, as assessed by any cluster-similarity metric.

The two instantiations of the refinement module 912 described above are cited by way of example, not limitation. Other implementations of the refinement module 912 are possible. That is, other implementations can annotate the parse trees with different (and/or additional) types of features, compared to the examples presented above. In addition, or alternatively, other implementations can use different techniques to cluster the annotated description information.

The refinement module 912 can also introduce features that depend on one more external sources of information, such as a foreign language dictionary, etc. For instance, the feature annotation module 1002 can add a feature to each terminal of a parse tree which indicates whether or not this element can be expressed as a translation of a specified word or phrase in a natural language. For example, assume that an element in a parse tree is associated with the word "man" in a sentence. The feature annotation module 1002 can add a feature to this element which indicates that this word "man" can be described by a translation of the Spanish word "hombre" (to cite merely one illustrative example). This feature defines a pivoting relationship. The clustering module 1004 can then perform clustering based on this feature, along with all of the other features. Through this process, the clustering module 1004 can identify a grouping of elements that can be characterized using the above-described pivoting relationship. The clustering module 1004 can also create a rule associated with this relationship, as well as a probability for this rule. This rule constitutes another part of the refined grammar that can be called upon to express a sentence in the language defined by the grammar. This rule is useful because it can economically express the mapping between a non-terminal symbol (such as a noun) and a set of words, without expressly enumerating those words.

The above-described distributional clustering technique can treat a pivot-based feature as an added dimension of an element's feature vector. The EM clustering technique can incorporate added features into its analysis in various ways, such as by applying gradient-based training (based on supervised logistic regression) when performing the maximization (M) phase of its iterative processing. Alternatively, a user can manually add rules to the refined ST-CFG that reflect the above-described kinds of pivoting relationships.

Figure 11:
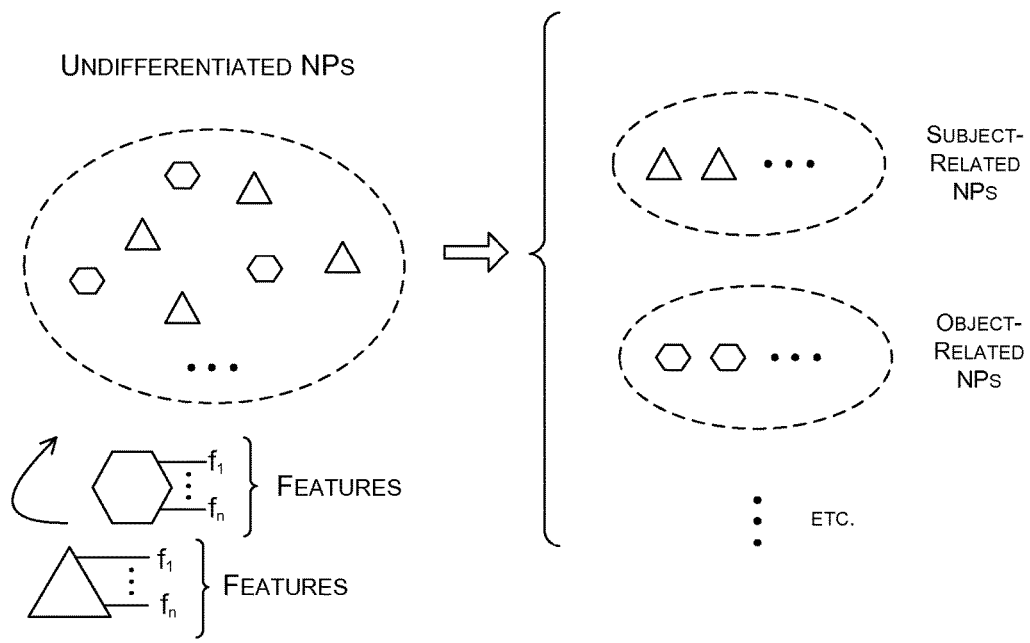
FIG. 11 shows one example of the application of the refinement module of FIG. 10.

FIG. 11 provides a simplified example of the application of the refinement module 912. Assume that a small part of the unrefined ST-CFG includes an undifferentiated combination of noun phrases (NPs) that serve different roles within the corpus of sentences. For example, among other categories, a first class of NPs may most commonly function as subjects within the sentences, while a second class of NPs may most commonly function as objects within sentences. In the descriptions listed in FIG. 4, the words "man," "guy," "person," etc. can be expected to be classified as the first type of NPs, while the words "wall," "barrier," "block," etc. can be expected to be classified as the second type of NPs.

The refinement module 912 can add features to each NP in the parse trees. In the case of distributional clustering, one feature may reflect whether the NP occurs at the beginning or end of a sentence. In the example of FIG. 4, this factor appears to meaningfully correlate with whether the NP functions as a subject or an object, respectively. The refinement module 912 then clusters the elements in the annotated description information. This may have effect of producing at least two categories of noun phrases, a first category associated with words that typically serve the role of subjects within sentences, and a second category associated with words that typically serve the role of objects within sentences. The refinement module 912 can then add new rules based on the identified categories.

In the case of the EM technique, the refinement module 912 can add at least two latent symbols to each NP non-terminal symbol, to yield annotated description information. The refinement module 912 can then iteratively adjust the weights of the rules in the annotated description information. This yields at least two categories of noun phrases, one of which may correspond to subject-related noun phrases, and another which may correspond to object-related noun phrases. If a hierarchical technique is used, the refinement module 912 may repeat the above-described splitting and clustering operation one or more additional times.

In the above examples, the refinement module 912 automatically performs the refinement operation, or at least performs the refinement operation in a partially automated manner. In another case, a user can manually refine the unrefined ST-CFG, e.g., by manually adding appropriate non-terminal symbols and appropriate rules that utilize these symbols.

B.6. Grammar-Synthesizing Module

Figure 12:
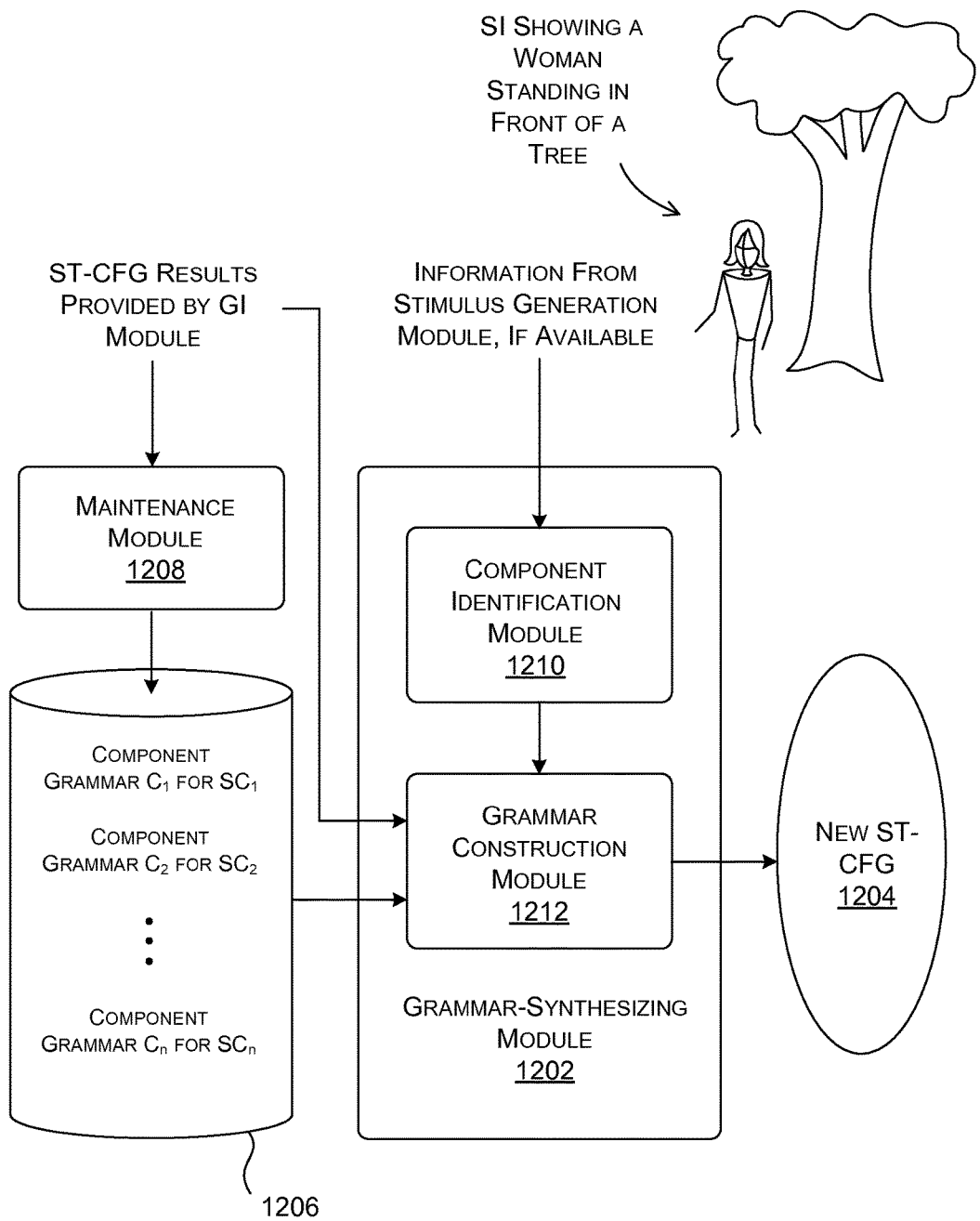
FIG. 12 shows one implementation of a grammar-synthesizing module. The grammar-synthesizing module produces an ST-CFG based on one or more component CFGs.

FIG. 12 illustrates one implementation of a grammar-synthesizing module 1202. The grammar-synthesizing module 1202 constructs an ST-CFG 1204 by drawing from one or more component context free grammars (CFGs) provided in a data store 1206. Each component CFG describes the rules associated with a particular concept that may be implicated by the descriptions. In other words, if the descriptions pertain to a particular subject, a component CFG describes the rules associated with a particular child subject encompassed by that subject.

In one implementation, the stimulus-generating (SG) module 502 produces instances of SI in a parameterized manner using the component table 604 (as described in Subsection B.2). In this case, the grammar-synthesizing module 1202 can also store a component CFG associated with each component of the component table 604. For example, a first overarching component CFG may provide the grammar rules associated with the basic sentence structure in which an actor performs an action with respect to a prop. Other component CFGs can provide grammar rules for different instantiations of the actor. Other component CFGs can provide grammar rules for different instantiations of actions. Other component CFGs can provide grammar rules for different instantiations of prepositional phrases involving props, and so on. This implementation is merely illustrative; generally, component CFGs can be developed to express the parts of any kind of sentence structure.

A maintenance module 1208 can store a new component grammar whenever the grammar-inducing (GI) module 506 produces an ST-CFG that pertains to a newly-encountered child subject, such as a new actor, a new action, or a new propositional phrase involving a prop. In addition, the maintenance module 1208 can update a previously-stored component CFG whenever the GI module 506 produces an ST-CFG that pertains to a previously-encountered child subject.

In one implementation, the grammar-synthesizing module 1202 includes a component identification module 1210 and a grammar construction module 1212. The component identification module 1210 identifies the subject for which an ST-CFG is to be developed. The component identification module 1210 then determines whether this subject can be broken up into plural parts, corresponding to different child subjects encompassed by the subject.

In one case, the component identification module 1210 can determine the child subjects based on knowledge of the stimulus components (SCs) that were selected by the SG module 502 to produce a current instance of SI. For example, assume that the SG module 502 produces an instance of SI by using SCs associated with the concepts of "woman," "standing," and "in front of a tree." The component identification module 1210 can leverage this information to determine that the subject includes the child subjects of "woman," "standing," and "in front of a tree." (Note that the prepositional phrase can be further broken down into the child subjects associated with a preposition and a noun, although, to facilitate explanation, this prepositional phrase is treated as a single unit in this merely illustrative example.)

Alternatively, or in addition, the component identification module 1210 can determine the parts of a subject by examining the descriptions provided by the participants 106 and/or by examining the parsed descriptions. For example, the component identification module 1210 can use the parsed trees to determine that most of the descriptions take the form of a subject performing an action with respect to some object. On that basis, the component identification module 1210 can demarcate different parts of the parsed descriptions as corresponding to different child subjects.

The grammar construction module 1212 then determines whether a component CFG exists for each of the plural parts identified by the component identification module 1210. If so, the grammar construction module 1212 can use that component CFG as part of the new ST-CFG that is being formed.

For example, in the illustrative scenario of FIG. 12, again assume that the SG module 502 produces a new instance of SI that shows a woman standing in front of a tree. Here, the actor is a woman, the action is standing, and the propositional phrase is "in front of a tree." The GI module 506 may have not yet induced an ST-CFG for this specific scenario. But it may have induced ST-CFGs for scenarios that involve the same woman character in other contexts, and/or the same standing action in other contexts, and/or the same prepositional phrase in other contexts. In view of this, the data store 1206 may already contain component CFGs that pertain, respectively, to the woman character, the action of standing, and the prepositional phrase that involves standing in front of a tree. In addition, the data store 1206 may provide a master (e.g., a top-level) CFG that provides a syntactic template for the scenario in which some character performs some action with respect to some prop, but without specifying the child grammars for specific characters, specific actions, and specific prepositional phrases. In response to this determination, the grammar construction module 1212 can assemble the appropriate component CFGs together to produce the final ST-CFG 1204. In one case, this assembly operation may constitute forming the union of the rules associated with different component grammars. The aggregation option may also entail adjusting the probabilities of the rules in an appropriate manner to address any overlap in rules among the component CFGs, etc.

In the above example, the grammar-synthesizing module 1202 may be able to construct the new ST-CFG 1205 without even collecting and processing descriptions from the participants 106. In other cases, the grammar-synthesizing module 1202 may determine that parts of a new scenario have been previously encountered, while other parts have not. Here, the grammar-synthesizing module 1202 can construct a new ST-CFG based on one or more component CFGs pulled from the data store 1206, together with one or more other component CFGs that are produced using the training process summarized in FIG. 1. For example, the grammar-synthesizing module 1202 may conclude that it has a component CFG for the action of "standing" and the concept of "woman," but not a CFG for the prepositional phrase "in front of a tree." The grammar-synthesizing module 1202 can rely on the GI module 506 to provide the component CFG for the identified prepositional phrase, while relying on the data store 1206 to provide the remaining component CFGs.

In yet another implementation, the grammar-synthesizing module 1202 can use component CFGs provided by the GI module 506 to further refine corresponding component CFGs in the data store 1206. For example, assume that the data store 1206 already contains a component CFG for the child subject of "standing." The GI module 506 can nevertheless produce a new component CFG for this child subject based on a set of descriptions that pertain to the act of standing. The grammar-synthesizing module 1202 can use the newly derived component CFG (obtained from the GI module 506) to refine the corresponding component CFG in the data store 1206. This yields an updated component CFG for the concept of standing. For example, refinement may entail adjusting the probabilities of the component CFG to take account for the additional descriptions that have been received, thereby potentially making the probabilities more accurate. The grammar-synthesizing module 1202 can then use the updated component CFG to produce the overall ST-CFG.

Still other implementations are possible which leverage the use of previously-induced component CFGs.

B.7. Illustrative Applications

Different applications can make use of an ST-CFG in different ways. This subsection identifies representative applications. In all the identified applications, the grammar-checking module 916 does not just determine whether the user is providing appropriate keywords in his or her description of a subject. Rather, the grammar-checking module 916 determines whether the description is considered to be an appropriate response from a syntactic and semantic perspective, with respect to the ST-CFG. For example, consider the new description which reads, "Wall Street stoops to new lows in concealing Hartford man's funds." While this sentence may contain words that are commonly found in the descriptions shown in FIG. 4, this description is otherwise unrelated to the subject of a man hiding behind a wall. The grammar-checking module 916 could automatically make this determination based on the refined ST-CFG.

In a first application, a challenge-response authentication engine ("authentication engine") can use the grammar-checking module 916 to determine whether a user's description is an appropriately-formed description, with respect to some ST-CFG. For example, the authentication engine can present an instance of SI in the context of a HIP presentation, such as the instance of SI 804 presented in the HIP presentation 802 of FIG. 8. The user can then enter a description in the input mechanism 808 which characterizes the instance of SI 804. The grammar-checking module 916 can then analyze the description to determine whether it is grammatical or ungrammatical with respect to the ST-CFG. If the description is grammatical, the authentication engine can allow the user to gain access to whatever resources are being protected by the authentication engine. If the description is not grammatical, the authentication engine can deny access to the protected resources.

In a second application, a testing engine can use the grammar-checking module 916 to determine whether an answer to a question is considered a properly-formed answer. The testing engine can be used in an academic setting, an employment-related testing setting, and so on.

In a third application, a linguistic engine can use the grammar-checking module 916 to determine whether a sentence or phrase is an appropriate translation of a foreign language sentence or phrase.

In a fourth application, a linguistic engine can use the grammar-checking module 916 to determine whether a sentence or phrase is an appropriate paraphrase of an original sentence or phrase.

In a fifth application, a command and control engine can use the grammar-checking module 916 to determine whether a description is an appropriately-constructed command to control some mechanism, such as a computer-implemented application.

In a sixth application, a classification engine can use the grammar-checking module 916 to classify an input sentence. For example, the grammar-checking module 916 can analyze the input sentence with respect to plural ST-CFGs. The classification engine can then identify the ST-CFG (and the associated subject) which yields the interpretation having the highest confidence level. For example, this application can be used to classify an article associated with a particular topic into an appropriate bin of articles that addresses the same topic.

To repeat, the above-identified applications are cited by way of illustration, not limitation. Still other applications are possible.

C. Illustrative Processes

FIGS. 13-17 show procedures that explain one manner of operation of the processing system 500 of FIG. 5. Since the principles underlying the operation of the processing system 500 have already been described in Sections A and B, certain operations will be addressed in summary fashion in this section.

Figure 13:
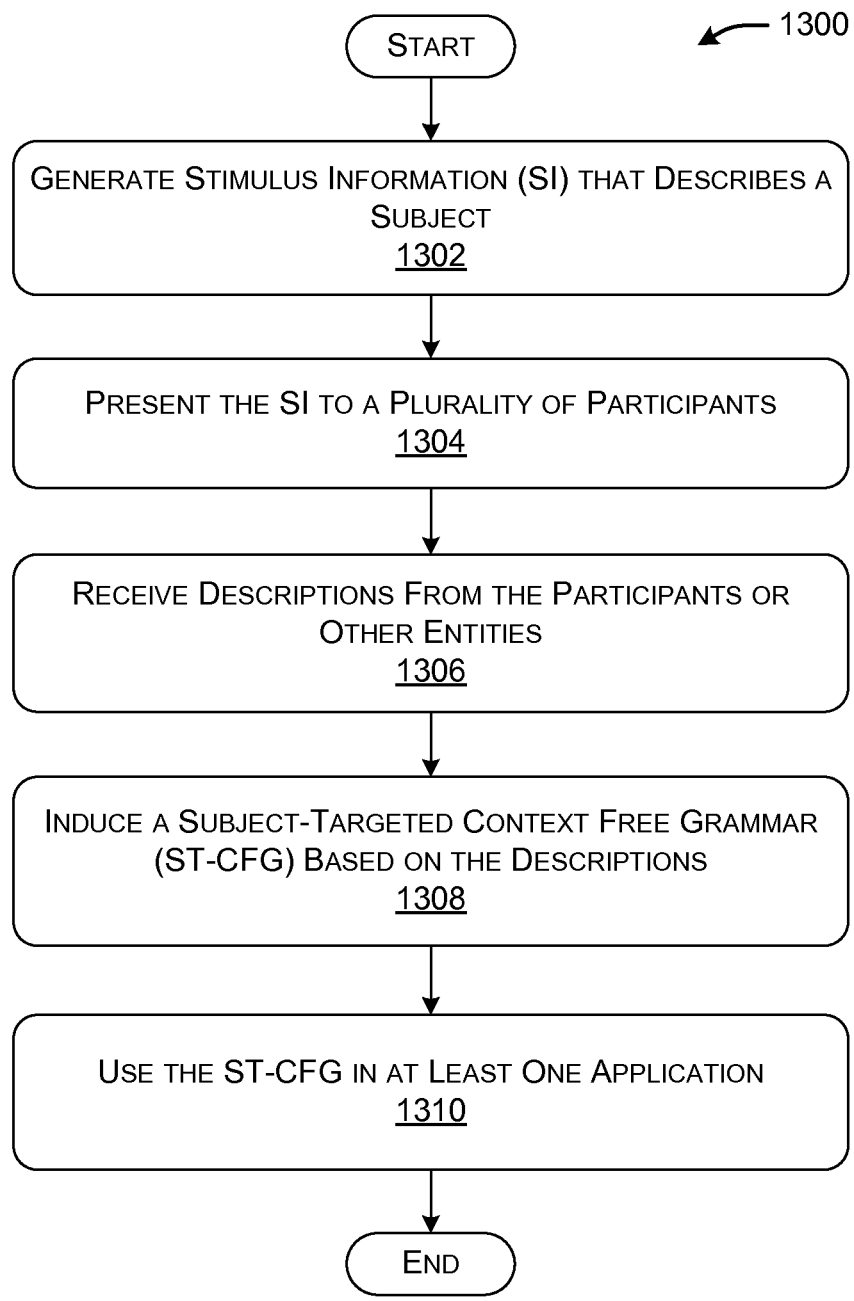
FIG. 13 is a procedure which describes one overall manner of operation of the processing system of FIG. 5.

FIG. 13 is a procedure 1300 which describes one overall manner of operation of the processing system 500 of FIG. 5. In block 1302, the processing system 500 optionally generates stimulus information (SI) that represents a subject of any type. In block 1304, the processing system 500 presents the instance of SI to a plurality of human participants 106. In block 1306, the processing system 500 receives the descriptions from the participants 106. Alternatively, or in addition, the processing system 500 can obtain the descriptions from one or more other sources. In block 1308, the processing system 500 can induce a subject-targeted context free grammar (ST-CFG) based on the descriptions. In block 1310, at least one application can use the ST-CFG to determine whether a new description conforms to the rules of the ST-CFG.

Figure 14:
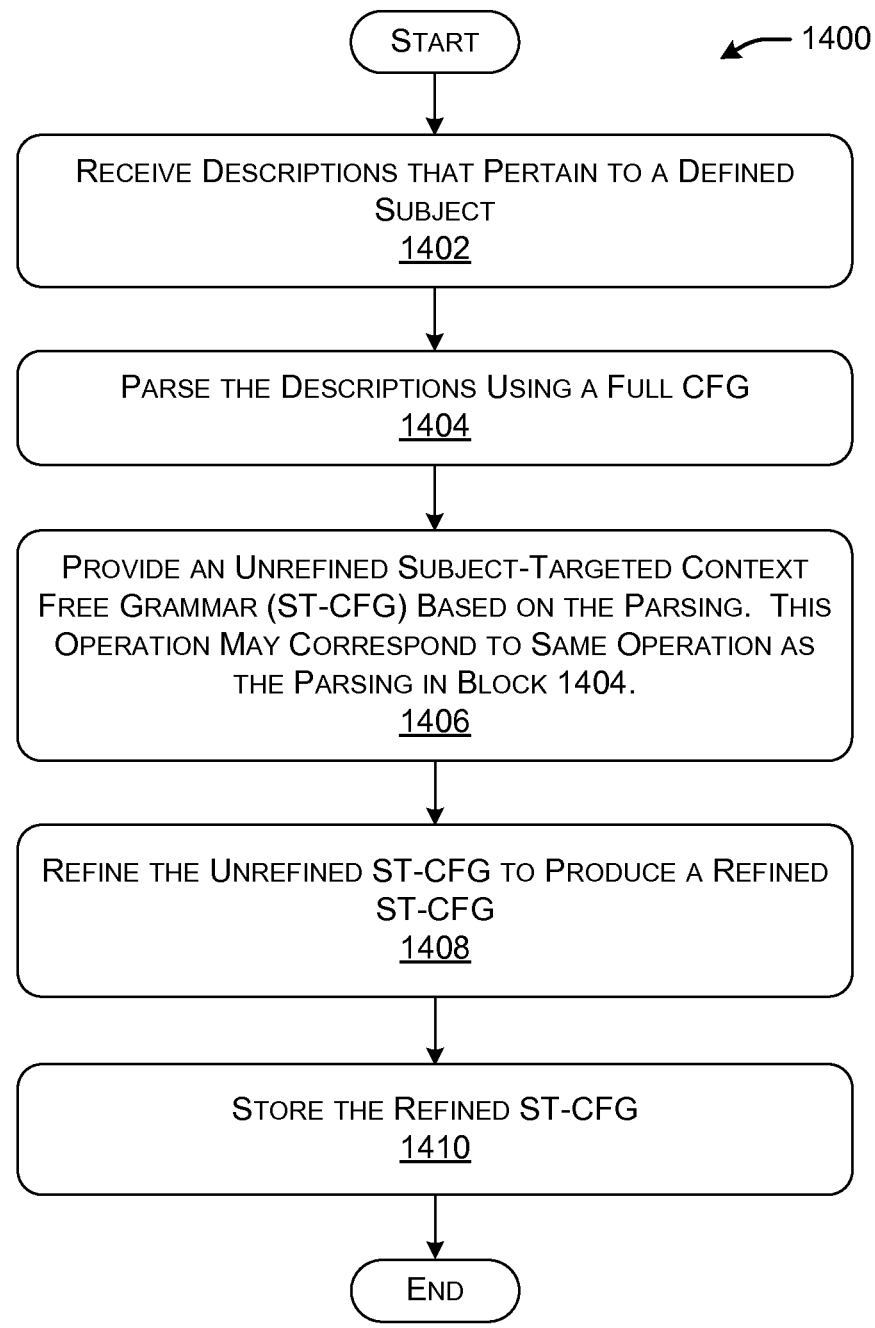
FIG. 14 is a procedure which describes one manner of operation of the GI module of FIG. 9.

FIG. 14 is a procedure 1400 which describes one manner of operation of the grammar-inducing (GI) module 506 of FIG. 9. In block 1402, the GI module 506 receives descriptions that pertain to a defined subject (or subjects). In block 1404, the GI module 506 parses the descriptions using a first context free grammar (CFG), to provide parsed description information. For example, the first CFG may correspond to a full subject-agnostic CFG of the English language. In block 1406, the GI module 506 provides an unrefined ST-CFG by retaining a subset of the first CFG that is used to parse the descriptions. In block 1408, the GI module 506 refines the unrefined ST-CFG to produce a refined ST-CFG. The refined ST-CFG models the descriptions with more precision compared to the unrefined ST-CFG. In block 1410, the GI module 506 stores the refined ST-CFG in the data store 914.

The operations illustrated in FIG. 14 are shown as distinct steps to clarify the explanation. But in some implementations, the illustrated operations need to correspond to discrete steps. For example, in block 1404 the GI module 506 parses the descriptions, which implicitly involves the application of some rules of the full CFG, while excluding other rules. In block 1408, the GI module 506 then refines those rules that are implicated in the parsed description information. In this context, the operation of extracting a subset of the full CFG (in block 1406) is an implicit part of the parsing operation itself. Any description of distinct parsing and extraction operations herein is intended to encompass the interpretation specified above, e.g., where parsing and extraction represent parts of the same operation.

Figure 15:
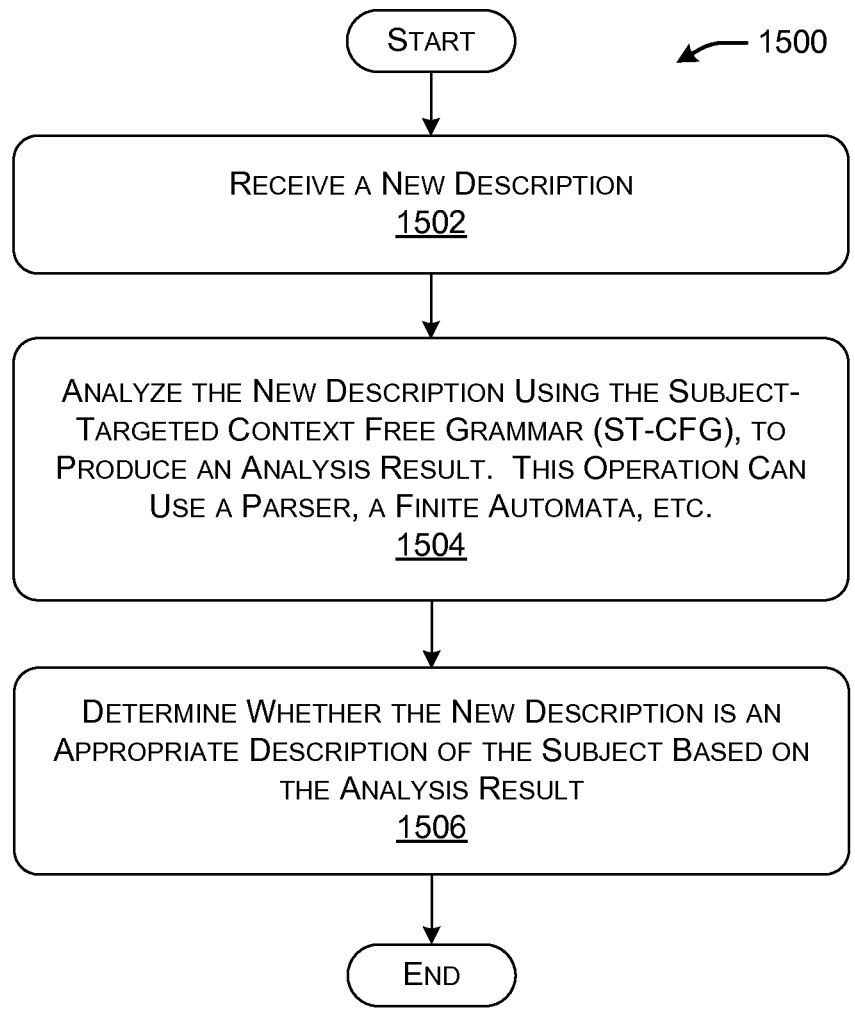
FIG. 15 is a procedure which describes one manner of operation of a grammar-checking module of FIG. 9. The grammar-checking module determines whether a new description conforms to the rules of an ST-CFG.

FIG. 15 is a procedure 1500 which describes one manner of operation of the grammar-checking module 916 of FIG. 9. In block 1502, the grammar-checking module receives a new description of a subject. In block 1504, the grammar-checking module analyzes the new description using the ST-CFG that was induced as per the procedure 1400 of FIG. 14. This yields an analysis result. In block 1506, the grammar-checking module determines whether the new description is an appropriate description of the subject, based on the analysis result. Block 1504 may involve parsing the new description, or processing the new description using a finite automata, etc.

Figure 16:
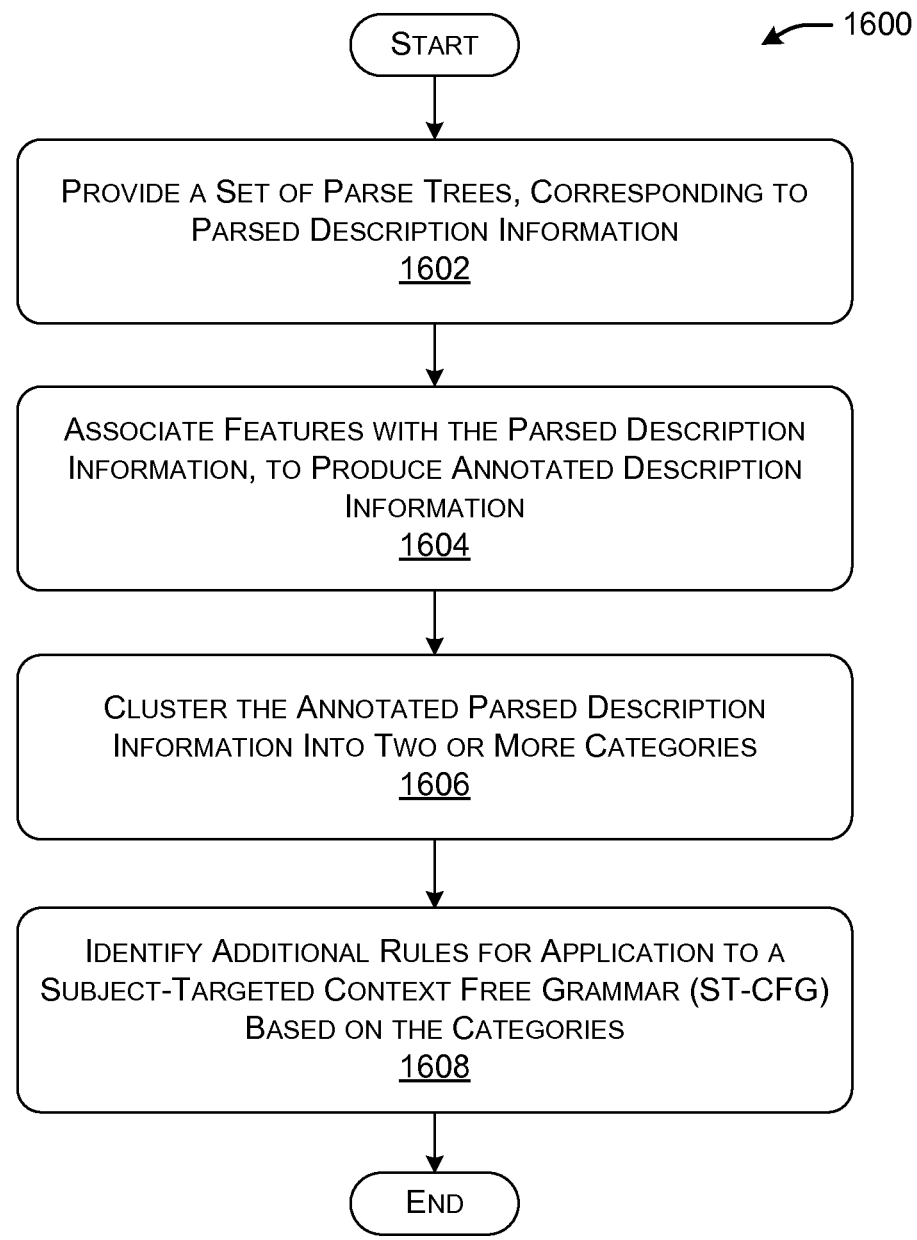
FIG. 16 is a procedure which describes one manner of operation of the refinement module of FIG. 10.

FIG. 16 is a procedure 1600 which describes one manner of operation of the refinement module 912 of FIG. 10. In block 1602, the refinement module receives a set of parse trees associated with the descriptions. The parse trees collectively constitute parsed description information. In block 1604, the refinement module 912 associates features with the parsed description information, to produce annotated description information. In block 1606, the refinement module 912 clusters the annotated description information to generate two or more categories. In block 1608, the refinement module 912 identifies additional non-terminal symbols and rules for inclusion in the refined ST-CFG based on the identified categories.

Figure 17:
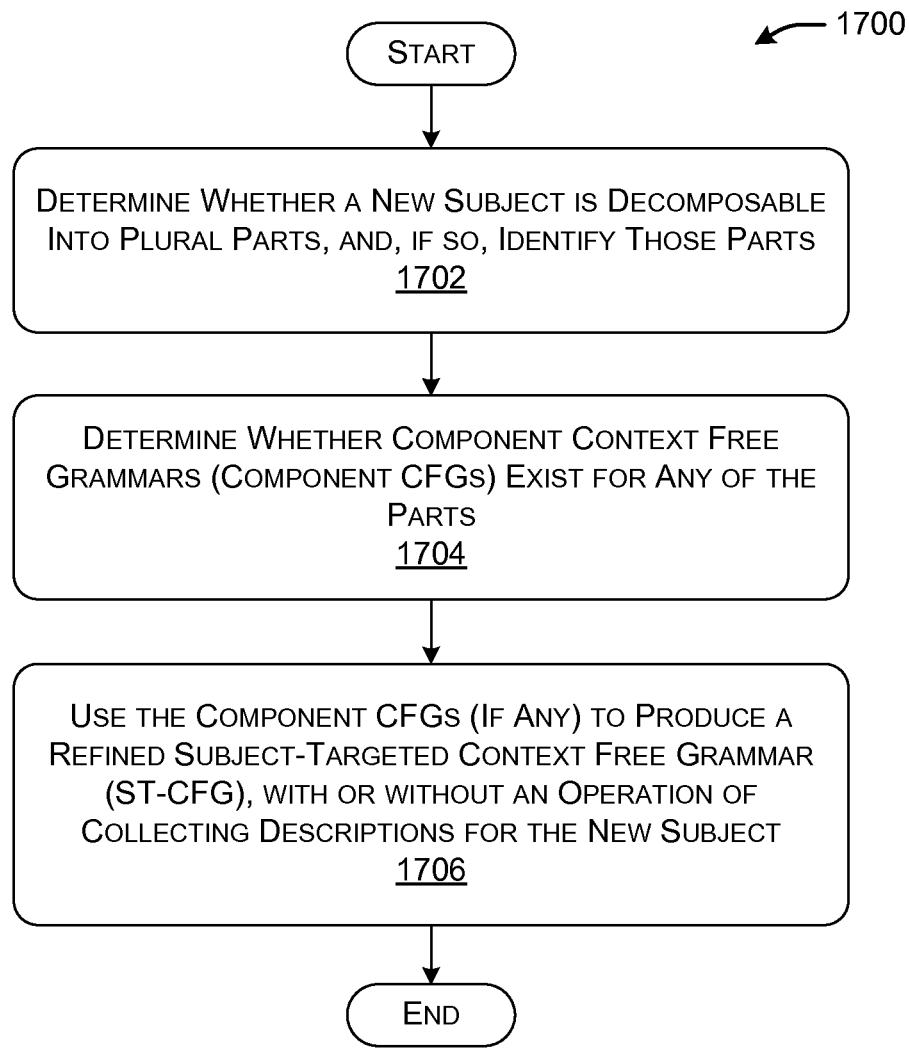
FIG. 17 is a procedure which describes one manner of operation of the grammar-synthesizing module of FIG. 12.

FIG. 17 is a procedure 1700 which describes one manner of operation of the grammar-synthesizing module 1202 of FIG. 12. In block 1702, the grammar-synthesizing module 1202 determines whether a new subject is decomposable into plural parts, and, if so, identifies those parts. In block 1704, the grammar-synthesizing module 1202 determines whether a component CFGs exists for each of the plural parts, to provide one or more component CFGs. In block 1706, the grammar-synthesizing module 1202 uses the component CFG(s) to produce the refined ST-CFG for the new subject. The procedure 1700 can be used instead of collecting descriptions, or in conjunction with the collection of descriptions.

D. Representative Computer Functionality

FIG. 18 sets forth illustrative computer functionality 1800 that can be used to implement any aspect of the functions described above. For example, the type of computer functionality 1800 shown in FIG. 18 can be used to implement any aspect of the processing system 500 of FIG. 5, including any of: the SG module 502; the DC module 504; the GI module 506; any of the applications 522; any of the user devices 414, and so on. In one case, the computer functionality 1800 may correspond to any type of computing device that includes one or more processing devices. In all cases, the computer functionality 1800 represents one or more physical and tangible processing mechanisms.

The computer functionality 1800 can include volatile and non-volatile memory, such as RAM 1802 and ROM 1804, as well as one or more processing devices 1806 (e.g., one or more CPUs, and/or one or more GPUs, etc.). The computer functionality 1800 also optionally includes various media devices 1808, such as a hard disk module, an optical disk module, and so forth. The computer functionality 1800 can perform various operations identified above when the processing device(s) 1806 executes instructions that are maintained by memory (e.g., RAM 1802, ROM 1804, or elsewhere).

More generally, instructions and other information can be stored on any computer readable medium 1810, including, but not limited to, static memory storage devices, magnetic storage devices, optical storage devices, and so on. The term computer readable medium also encompasses plural storage devices. In many cases, the computer readable medium 1810 represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computer functionality 1800 also includes an input/output module 1812 for receiving various inputs (via input devices 1814), and for providing various outputs (via output devices). Illustrative input devices include a keyboard device, a mouse input device, a touchscreen input device, a gesture input device, a voice recognition mechanism, and so on. One particular output device may include a presentation device 1816 and an associated graphical user interface (GUI) 1818. The computer functionality 1800 can also include one or more network interfaces 1820 for exchanging data with other devices via one or more communication conduits 1822. One or more communication buses 1824 communicatively couple the above-described components together.

The communication conduit(s) 1822 can be implemented in any manner, e.g., by a local area network, a wide area network (e.g., the Internet), point-to-point connections, etc., or any combination thereof. The communication conduit(s) 1822 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computer functionality can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the functionality described herein can employ various mechanisms to ensure the privacy of user data maintained by the functionality (if any). For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems. This manner of explanation does not constitute an admission that others have appreciated and/or articulated the challenges or problems in the manner specified herein. Further, the claimed subject matter is not limited to implementations that solve any or all of the noted challenges/problems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for inducing a context free grammar, the method comprising:
    receiving descriptions that pertain to a defined focus of interest from a set of data;
    parsing the descriptions using a first context free grammar (CFG) comprising a set of rules and non-terminal symbols that describe syntactic categories, to provide parsed description information;
    providing an unrefined subject-targeted context free grammar (ST-CFG) by retaining a subset of the set rules of the first CFG that is used to parse the descriptions;
    refining the unrefined ST-CFG to produce a refined ST-CFG, the refined ST-CFG modeling the descriptions more accurately compared to the unrefined ST-CFG, the refining comprising:
        associating features with terms in the parsed description information to produce annotated description information, the features associating the terms in the parsed description with information related to the defined focus of interest;
        clustering the annotated description information to generate two or more categories; and
        identifying additional rules and additional non-terminal symbols to apply to the unrefined ST-CFG based on said two or more categories, to produce the refined ST-CFG, the additional rules and the additional non-terminal symbols not being in the set of rules and the non-terminal symbols of the first CFG; and
    determining that the refined ST-CFG is grammatical; and
    based on the determination that the refined ST-CFG is grammatical, enabling access to protected resources.

2. The method of claim 1, further comprising applying the refined ST-CFG by:
    receiving a new description of the defined focus of interest;
    analyzing the new description using the refined ST-CFG, to produce an analysis result; and
    based on the analysis result, determining whether the new description is an appropriate description of the defined focus of interest.

3. The method of claim 1, wherein the defined focus of interest pertains to a target entity.

4. The method of claim 3, wherein the target entity corresponds to one or more entities selected from: an object; an event; and a state.

5. The method of claim 1, wherein the defined focus of interest corresponds to a portion of linguistic information.

6. The method of claim 1, wherein the descriptions correspond to characterizations of stimulus information, the stimulus information representing the defined focus of interest, and wherein the stimulus information is expressed by one or more forms of media content selected from: video content; image content; and audio content.

7. The method of claim 1, further comprising:
    generating stimulus information that represents the defined focus of interest; and
    presenting the stimulus information to a plurality of human participants, wherein said receiving comprises receiving the descriptions from the human participants, the human participants formulating a description that characterizes the stimulus information.

8. The method of claim 1, wherein the first CFG corresponds to a subject-agnostic CFG that defines a natural language.

9. The method of claim 1, wherein said providing comprises identifying rules in the first CFG that are used to parse the descriptions.

10. The method of claim 1, wherein said parsing and said providing comprise a single operation.

11. The method of claim 1, wherein at least one additional rule added to the refined ST-CFG indirectly specifies a set of linguistic items in a first natural language by identifying a linguistic item in a second natural language, the linguistic item in the second natural language being an appropriate translation of the set of linguistic items in the first natural language.

12. The method of claim 1, further comprising formulating a refined ST-CFG for a new subject by:
    determining whether the new subject is decomposable into plural parts, and, if so, identifying those parts;
    determining whether a component CFG exists for the plural parts, to provide one or more component CFGs; and
    using said one or more component CFGs to produce the refined ST-CFG for the new subject, with or without collecting descriptions for the new subject.

13. A processing system, implemented by one or more computer devices, for inducing a context free grammar, the system comprising:
    a stimulus-generating module configured to generate stimulus information that represents a focus of interest;
    a description-collection module configured to:
        present the stimulus information to a plurality of human participants; and
        receive descriptions from the human participants, a human participant formulating a description that characterizes the stimulus information; and
    a grammar-inducing module, comprising:
        a parsing module configured to parse the descriptions using a first context free grammar (CFG) comprising a set of rules and non-terminal symbols that describe syntactic categories, to provide parsed description information, the parsed description information providing an unrefined subject-targeted context free grammar (ST-CFG) by retaining a subset of the set rules of the first CFG that is used to parse the descriptions;
        a refinement module configured to refine the unrefined ST-CFG to produce a refined ST-CFG by associating features with terms in the parsed description information to produce annotated description information, the features associating the terms in the parsed description with information related to the focus of interest, and applying additional rules and additional non-terminal symbols to the unrefined ST-CFG based on the annotated description information, the refined ST-CFG including syntactic categories and the additional rules that model the descriptions more accurately compared to the unrefined ST-CFG, the additional rules and the additional non-terminal symbols not being in the set of rules and the non-terminal symbols of the first CFG; and
        an authentication engine configured to:
            determining that the refined ST-CFG is grammatical; and
            based on the determination that the refined ST-CFG is grammatical, enabling access to protected resources.

14. The processing system of claim 13, further comprising a grammar-checking module configured to:
    receive a new description of the focus of interest;
    analyze the new description using the refined ST-CFG, to produce an analysis result; and
    based on the analysis result, determine whether the new description is an appropriate description of the focus of interest.

15. A computer readable storage medium for storing computer readable instructions, the computer readable instructions providing a processing system when executed by one or more processing devices, the computer readable instructions comprising:
    receiving descriptions that pertain to a defined focus of interest from a set of data;
    parsing the descriptions using a first context free grammar (CFG) comprising a set of rules and non-terminal symbols that describe syntactic categories, to provide parsed description information;
    providing an unrefined subject-targeted context free grammar (ST-CFG) by retaining a subset of the set rules of the first CFG that is used to parse the descriptions;
    refining the unrefined ST-CFG to produce a refined ST-CFG, the refined ST-CFG modeling the descriptions more accurately compared to the unrefined ST-CFG, the refining comprising:
        associating features with terms in the parsed description information to produce annotated description information, the features associating the terms in the parsed description with information related to the defined focus of interest;
        clustering the annotated description information to generate two or more categories; and
        identifying additional rules and additional non-terminal symbols to apply to the unrefined ST-CFG based on said two or more categories, to produce the refined ST-CFG, the additional rules and the additional non-terminal symbols not being in the set of rules and the non-terminal symbols of the first CFG; and
    determining that the refined ST-CFG is grammatical; and
    based on the determination that the refined ST-CFG is grammatical, enabling access to protected resources.

16. The computer readable storage medium of claim 15, further comprising:
    applying the refined ST-CFG by:
    receiving a new description of the defined focus of interest;
    analyzing the new description using the refined ST-CFG, to produce an analysis result; and
    based on the analysis result, determining whether the new description is an appropriate description of the defined focus of interest.

17. The computer readable storage medium of claim 15, wherein the defined focus of interest pertains to a target entity.

18. The computer readable storage medium of claim 15, wherein the defined focus of interest corresponds to a portion of linguistic information.

19. The computer readable storage medium of claim 15, wherein the descriptions correspond to characterizations of stimulus information, the stimulus information representing the defined focus of interest, and wherein the stimulus information is expressed by one or more forms of media content selected from: video content;
    image content; and audio content.

20. The computer readable storage medium of claim 15, wherein the first CFG corresponds to a subject-agnostic CFG that defines a natural language.

\* \* \* \* \*